US011214298B2

(12) United States Patent
Kitazume et al.

(10) Patent No.: US 11,214,298 B2
(45) Date of Patent: Jan. 4, 2022

(54) ELECTRIC POWER STEERING APPARATUS

(71) Applicant: NSK LTD., Tokyo (JP)

(72) Inventors: Tetsuya Kitazume, Maebashi (JP); Satoshi Shimokawabe, Maebashi (JP)

(73) Assignee: NSK LTD., Tokyo (JP)

( * ) Notice: Subject to any disclaimer, the term of this patent is extended or adjusted under 35 U.S.C. 154(b) by 235 days.

(21) Appl. No.: 16/068,167

(22) PCT Filed: Jan. 15, 2018

(86) PCT No.: PCT/JP2018/000861
§ 371 (c)(1),
(2) Date: Jul. 5, 2018

(87) PCT Pub. No.: WO2018/142905
PCT Pub. Date: Aug. 9, 2018

(65) Prior Publication Data
US 2021/0206426 A1    Jul. 8, 2021

(30) Foreign Application Priority Data

Feb. 2, 2017 (JP) .............................. JP2017-017384
Aug. 7, 2017 (WO) .................. PCT/JP2017/028610

(51) Int. Cl.
*B62D 5/04* (2006.01)
*B62D 15/02* (2006.01)
*B62D 6/00* (2006.01)
*B62D 1/28* (2006.01)

(52) U.S. Cl.
CPC ......... *B62D 5/0466* (2013.01); *B62D 5/0409* (2013.01)

(58) Field of Classification Search
None
See application file for complete search history.

(56) References Cited

U.S. PATENT DOCUMENTS

| 9,446,789 | B2 * | 9/2016 | Tsubaki | ............... | B62D 15/025 |
| 2017/0137057 | A1 * | 5/2017 | Kitazume | ............ | B62D 5/0463 |
| 2018/0186406 | A1 * | 7/2018 | Itou | ........................ | B62D 6/005 |

FOREIGN PATENT DOCUMENTS

| JP | 4685557 | B2 | 5/2011 |
| JP | 2017-013625 | A | 1/2017 |
| WO | 2014/167631 | A1 | 10/2014 |
| WO | 2016/017234 | A1 | 2/2016 |
| WO | WO-2016017234 | A1 * | 2/2016 | ........... B62D 5/0463 |

* cited by examiner

*Primary Examiner* — Adam D Tissot
(74) *Attorney, Agent, or Firm* — Sughrue Mion, PLLC

(57) ABSTRACT

The present invention is the electric power steering apparatus that drives a motor based on the current command value and assist-controls a steering system by a driving-control of the motor, comprising: a handle-returning control section to calculate the target steering angle velocity for handle-returning based on the steering torque, the current command value, a vehicle speed, a steering angle, calculate the handle-returning control current based on a deviation between the steering angle velocity and the target steering angle velocity, and interpose a filter, which motion characteristic, in a calculation path of the target steering angle velocity, wherein the motor is driven by the corrected current command value by using the handle-returning control current.

26 Claims, 25 Drawing Sheets

PRIOR ART

ELECTRIC POWER STEERING APPARATUS

CROSS REFERENCE TO RELATED APPLICATIONS

This application is a National Stage of International Application No. PCT/JP2018/000861 filed Jan. 15, 2018, claiming priority based on Japanese Patent Application No. 2017-017384 filed Feb. 2, 2017 and International Application No. PCT/JP2017/028610 filed Aug. 7, 2017.

TECHNICAL FIELD

The present invention relates to an electric power steering apparatus having a function to perform a handle-returning control that is consistent with an intention of a driver by using, for a calculation of a target steering angle velocity, only a steering input due to the intention of the driver included in a steering torque and an assist torque (a current command value) or only a vehicle motion characteristic based on the steering input, in particular in the handle-returning control of the electric power steering apparatus to perform a proportional-integral-differential control (PID control) and the like for a velocity deviation between the target steering angle velocity and an actual steering angle velocity. The present invention in particular relates to the electric power steering apparatus that improves reliability in the handle-returning function, by calculating the target steering angle velocity by removing external disturbance components included in the steering torque and an assist current and then correcting the current command value with the handle-returning control current, so as to actively and smoothly return a handle (a steering wheel) to a neutral point in a running state which is returned to a straight running state.

Further, the present invention relates to a high quality performance electric power steering apparatus that calculates the handle-returning control current by phase-compensating the velocity deviation between the target steering angle velocity and the actual steering angle velocity, and making a viscosity coefficient used in a calculation of the target steering angle velocity changeable depending on a steering-forward state and a steering-backward state of the steering system.

BACKGROUND ART

An electric power steering apparatus (EPS) that provides a steering mechanism of a vehicle with an assist torque by means of a rotational torque of a motor, applies a driving force of a motor as a steering assist torque to a steering shaft or a rack shaft by means of a transmission mechanism such as gears or a belt through a reduction mechanism. In order to accurately generate the assist torque, such a conventional electric power steering apparatus (EPS) performs a feed-back control of a motor current. The feed-back control adjusts a voltage supplied to the motor so that a difference between a steering assist command value (a current command value) and a detected motor current value becomes small, and the adjustment of the voltage supplied to the motor is generally performed by an adjustment of duty command values of a pulse width modulation (PWM) control.

A general configuration of the conventional electric power steering apparatus will be described with reference to FIG. 1. As shown in FIG. 1, a column shaft (a steering shaft or a handle shaft) 2 connected to a steering wheel (handle) 1 is connected to steered wheels 8L and 8R through reduction gears 3, universal joints 4a and 4b, a rack-and-pinion mechanism 5, and tie rods 6a and 6b, further via hub units 7a and 7b. In addition, the column shaft 2 is provided with a torque sensor 10 for detecting a steering torque Td of the steering wheel 1 and a steering angle sensor 14 for detecting a steering angle θ, and the motor 20 for assisting a steering force of the steering wheel 1 is connected to the column shaft 2 through the reduction gears 3. The electric power is supplied to a control unit (ECU) 30 for controlling the electric power steering apparatus from a battery 13, and an ignition key signal is inputted into the control unit 30 through an ignition key 11. The control unit 30 calculates a current command value of an assist command on the basis of the steering torque Td detected by the torque sensor 10 and a vehicle speed Vs detected by a vehicle speed sensor 12, and controls a current supplied to the motor 20 by means of a voltage control command value Vref obtained by performing compensation or the like to the current command value. A steering angle sensor 14 is not indispensable and may not be provided.

A controller area network (CAN) 50 to send/receive various information and signals on the vehicle is connected to the control unit 30, and it is also possible to receive the vehicle speed Vs from the CAN 50. Further, a Non-CAN 51 is also possible to connect to the control unit 30, and the Non-CAN 51 sends and receives a communication, analogue/digital signals, electric wave or the like except for the CAN 50.

The control unit 30 mainly comprises a central processing unit (CPU) (including a micro controller unit (MCU) and a micro processor unit (MPU)), and general functions performed by programs within the CPU are, for example, shown in FIG. 2.

Functions and operations of the control unit 30 will be described with reference to FIG. 2. As shown in FIG. 2, the steering torque Td detected by the torque sensor 10 and the vehicle speed Vs detected by the vehicle speed sensor 12 (or from the CAN 50) are inputted into a current command value calculating section 31 which calculates the current command value Iref1. The current command value calculating section 31 calculates the current command value Iref1, based on the steering torque Td and the vehicle speed Vs with reference to an assist map or the like, which is a control target value of a current supplied to the motor 20. The calculated current command value Iref1 is inputted into a current limiting section 33 via an adding section 32A, and the current command value Irefm whose maximum current is limited is inputted into a subtracting section 32B. A current deviation ΔI (=Irefm−Im) between the current command value Irefm and a motor current value Im which is fed-back is calculated at the subtracting section 32B, and the current deviation ΔI is inputted into a proportional-integral-control (PI-control) section 35 for improving a current characteristic of the steering operation. The voltage control command value Vref that the characteristic is improved at the PI-control section 35, is inputted into a PWM-control section 36, and the motor 20 is PWM-driven through an inverter 37 serving as a driving section. The motor current value Im of the motor 20 is detected by a motor current detector 38 and is fed-back to the subtracting section 32B. Field-effect transistors (FETs) are used as a driving device at the inverter 37, and the inverter 37 is constituted by a bridge circuit of the FETs.

A compensation signal CM from a compensation signal generating section 34 is added at the adding section 32A. A characteristic compensation of the steering system is performed by adding the compensation signal CM, and a convergence, an inertia characteristic and the like are improved. The compensation signal generating section 34 adds a self-aligning torque (SAT) 343 to an inertia 342 at an adding section 344. The adding result is further added with a convergence 341 at an adding section 345. The adding result at the adding section 345 is treated as the compensation signal CM.

In such an electric power steering apparatus, friction due to the reduction gears and the rack-and-pinion is large, and an equivalent inertia moment around the steering shaft due to the motor in order to generate the assist torque is large. Thus, in a case that a self-aligning torque (SAT) is small in a low vehicle speed range, a handle-returning is not adequate because the friction is larger than the SAT. That is, the steering angle is not returned to a neutral point by only the SAT when the steering shaft is returned to a straight running state in a low vehicle speed range. In this connection, it is necessary to return the steering angle to the neutral point by means of a steering intervention by the driver, and this is a burden on the driver.

On the other hand, in a case that the SAT is large in a high speed range, the steering angle velocity of the handle-returning tends to be fast in comparison with the low vehicle speed due to the large SAT. However, since the inertia moment is large, an inertia torque is large, and the handle is not converged at the neutral point of the steering angle and is overshot. Under such a situation, the driver feels that vehicle characteristics are unstable.

Accordingly, it is necessary to assist the handle-returning in the low vehicle speed and to improve the convergence in order to stabilize the vehicle characteristics in the high vehicle speed. In order to achieve the above requirements, various control methods, which perform an appropriate assist when returning the handle, are proposed. In those handle-returning controls, the electric power steering apparatus as a prior art whose object is to perform the smooth handle-returning control even in the steering intervention by the driver is disclosed in Japanese Patent No. 4685557 B2 (Patent Document 1).

In the apparatus of Patent Document 1, a controller, which follows the target steering angle velocity, calculates the target steering angle velocity by performing multiplying and adding corrections by the vehicle speed and the torque to a base target steering angle velocity. In the steering intervention by the driver, uncomfortable feeling for the driver when the driver steers the handle, is reduced by correcting the target steering angle velocity to a direction which the torque is applied.

THE LIST OF PRIOR ART DOCUMENTS

Patent Documents

Patent Document 1: Japanese Patent No. 4685557 B2

SUMMARY OF THE INVENTION

Problems to be Solved by the Invention

In order to realize the smooth handle-returning with no hands state, it is preferred that a steering angle acceleration does not largely vary and the steering angle velocity at the steering angle neutral point becomes zero. However, in the apparatus according to Patent Document 1, when the target steering angle velocity is set, the correction by the steering torque is performed, but the correction by the assist torque is not performed. Generally, the higher the vehicle speed is, the smaller the assist torque is set. Therefore, in the corrections by the steering torque and the vehicle speed, there is a problem that a setting of a preferable correction amount takes time. In a case that the excessive value is set, the handle-returning control is excessively operated, and then the driver feels uncomfortable.

The present invention has been developed in view of the above-described circumstances, and an object of the present invention is to provide the electric power steering apparatus having a function to perform a handle-returning control that is consistent with an intention of a driver by using, for a calculation of a target steering angle velocity, only a steering intention of the driver included in a steering torque and an assist current or only a vehicle motion characteristic, or by calculating the target steering angle velocity by removing external disturbance components included in the steering torque and assist current, in the handle-returning control to perform a PID control and the like for a velocity deviation between the target steering angle velocity and an actual steering angle velocity. Another object of the present invention is to provide the electric power steering apparatus that can realize the smooth handle-returning control without the uncomfortable feeling, by performing the correction in consideration of the vehicle characteristics based on the steering torque, the vehicle speed and the steering state even in the steering intervention by the driver.

Means for Solving the Problems

The present invention relates to an electric power steering apparatus that calculates a current command value based on at least a steering torque, drives a motor based on the current command value and assist-controls a steering system by a driving-control of the motor, the above-described object of the present invention is achieved by that comprising: a handle-returning control section to calculate a handle-returning control current according to a steering angle, the steering torque, the current command value, a vehicle speed and an actual steering angle velocity, and to drive the motor with a compensated current command value obtained by subtracting the handle-returning control current from the current command value, wherein the handle-returning control section has a configuration to calculate a target steering angle velocity in considering a viscosity coefficient of the steering system and to calculate the handle-returning control current based on a velocity deviation between the target steering angle velocity and the actual steering angle velocity, and wherein the viscosity coefficient is changed or switched depending on a steering-forward state and a steering-backward state of the steering system, or comprising: a handle-returning control section to calculate a handle-returning control current according to a steering angle, the steering torque, the current command value, a vehicle speed and an actual steering angle velocity, and to drive the motor with a compensated current command value obtained by subtracting the handle-returning control current from the current command value, wherein the handle-returning control section has a configuration to calculate the handle-returning control current based on a velocity deviation between a target steering angle velocity and the actual steering angle velocity, and wherein the target steering angle velocity is calculated by correcting the steering torque, or an assist torque calculated from the current command value, or both the steering torque and the assist torque, or an addition torque value of the steering torque and the assist torque, or comprising: a handle-returning control section to calculate a handle-returning control current according to a steering angle, the steering torque, the current command value, a vehicle speed and an actual steering angle velocity, and to drive the motor with a compensated current command value obtained by subtracting the handle-returning control current from the current command value, wherein the handle-returning control section has a configuration to calculate the handle-returning control current by phase-compensating a velocity deviation between the target steering angle velocity and the actual steering angle velocity at a phase compensating section.

The present invention relates to then electric power steering apparatus that calculates a current command value based on at least a steering torque, drives a motor based on the current command value and assist-controls a steering system by a driving-control of the motor, the above-described object of the present invention is achieved by that comprising: a handle-returning control section to calculate a handle-returning control current according to a steering angle, the steering torque, the current command value, a vehicle speed and an actual steering angle velocity, and to drive the motor with a compensated current command value obtained by subtracting the handle-returning control current from the current command value, wherein the handle-returning control section comprises: a target returning velocity calculating section to calculate a target returning velocity based on the steering angle and the vehicle speed; a steering torque gain section to calculate a steering torque gain based on the steering torque; a steering-forward/steering-backward judging section to output a steering-forward/steering-backward information by judging a steering-forward state and a steering-backward state of the steering system; a viscosity coefficient outputting section to calculate a viscosity coefficient of the steering system based on the vehicle speed and the steering-forward/steering-backward information; a vehicle speed gain section to obtain a vehicle speed gain based on the vehicle speed; a first steering system characteristic section to calculate a target velocity value from an addition value, which is added the steering torque to an assist torque calculated from the current command value, and the viscosity coefficient; a second steering system characteristic section to input an addition velocity value obtained by adding the target returning velocity and the target velocity value; and to obtain a target steering angle velocity from the viscosity coefficient and an inertia moment of the steering system; a handle-returning control gain calculating section to calculate a handle-returning control gain by multiplying a velocity deviation between the target steering angle velocity and the actual steering angle velocity with the vehicle speed gain and the steering torque gain; and a handle-returning control current calculating section to perform at least one control calculation of a proportional control calculation (P), an integral control calculation (I) and a differential control calculation (D) for the handle-returning control gain, and to obtain the handle-returning control current by output-limiting with the vehicle speed gain and the steering torque gain, or comprising: a handle-returning control section to calculate a handle-returning control current according to a steering angle, the steering torque, the current command value, a vehicle speed and an actual steering angle velocity, and to drive the motor with a compensated current command value obtained by subtracting the handle-returning control current from the current command value, wherein the handle-returning control section comprises: a target returning velocity calculating section to calculate a target returning velocity based on the steering angle and the vehicle speed; a steering torque gain section to obtain a steering torque gain based on the steering torque; a viscosity coefficient outputting section to obtain a viscosity coefficient C of the steering system based on the vehicle speed; a vehicle speed gain section to obtain a vehicle speed gain based on the vehicle speed; a first steering system characteristic section to calculate a target velocity value $\omega_1$ from an addition value, which is added the steering torque to an assist torque calculated from the current command value, and the viscosity coefficient C; an adjusting section that has an adjustment of a gain or a dead band width for at least one of the steering torque, the current command value and the assist torque, or for an addition value of the steering torque and the assist torque; a filter to filter-process the target velocity value $\omega_1$; a second steering system characteristic section to input a target velocity value $\omega_3$ obtained from the target returning velocity and a target velocity value $\omega_2$ from the filter, and to obtain a target steering angle velocity from said viscosity coefficient C and an inertia moment J of the steering system; a handle-returning control gain calculating section to calculate a handle-returning control gain by multiplying a velocity deviation between the target steering angle velocity and the actual steering angle velocity with the vehicle speed gain and the steering torque gain; and a handle-returning control current calculating section to perform at least one control calculation of a proportional control calculation (P), an integral control calculation (I) and a differential control calculation (D) for the handle-returning control gain, and to obtain the handle-returning control current by output-limiting with the vehicle speed gain and the steering torque gain, or comprising: a handle-returning control section to calculate a handle-returning control current according to a steering angle, the steering torque, the current command value, a vehicle speed and an actual steering angle velocity, and to drive the motor with a compensated current command value obtained by subtracting the handle-returning control current from the current command value, wherein the handle-returning control section comprises: a target returning velocity calculating section to calculate a target returning velocity based on the steering angle and the vehicle speed; a steering torque gain section to obtain a steering torque gain based on the steering torque; a viscosity coefficient outputting section to obtain a viscosity coefficient C of the steering system based on the vehicle speed; a vehicle speed gain section to obtain a vehicle speed gain based on the vehicle speed; a first steering system characteristic section to calculate a target velocity value $\omega_1$ from an addition value, which is added the steering torque to an assist torque calculated from the current command value, and the viscosity coefficient C; a filter to filter-process the target velocity value $\omega_1$; a second steering system characteristic section to input a target velocity value $\omega_3$ obtained by correction-processing the target returning velocity with a target velocity value $\omega_2$ from the filter, and to obtain a target steering angle velocity from the viscosity coefficient C and an inertia moment J of the steering system; a phase compensating section to phase-compensate a velocity deviation between the target steering angle velocity and the actual steering angle velocity; a handle-returning control gain calculating section to calculate a handle-returning control gain by multiplying a compensated velocity deviation from the phase compensating section with the vehicle speed gain and the steering torque gain; and a handle-returning control current calculating section to perform at least one control calculation of a proportional control calculation (P), an integral control calculation (I) and a differential control calculation (D) for the handle-returning control gain, and to obtain the handle-returning control current by output-limiting with the vehicle speed gain and the steering torque gain.

Effects of the Invention

In the electric power steering apparatus according to the present invention, since a virtual inertia moment and a virtual viscosity coefficient can be set in a virtual steering system (a vehicle) model, even in a case that the apparatus has the unfavorable inertia moment and the unfavorable viscosity coefficient as steering system characteristics, it is possible to approximate to the virtual inertia moment and the virtual viscosity coefficient by calculating the target steering angle velocity by means of the virtual steering system (the vehicle) model, and performing a feedback-control. Thereby, when the running state is returned to the straight running state, the handle can be actively returned to the neutral point without the uncomfortable feeling.

In the present invention (the first embodiment to the fourth embodiment), in order to reduce the uncomfortable feeling due to a variation component (an external disturbance from a road surface and the like) that the intention of the driver is not represented, there is provided an adjusting section to adjust the gain so as to make the output small or an adjusting section having the dead band width in a minute region that the steering torque or the assist torque, or both of them (or the addition torque value of the steering torque and the assist torque) are small. Thereby, the calculated target steering angle velocity is stabilized, and the smooth returning steering feeling by the handle-returning control can be realized. Particularly, in the substantially straight running, a lightly steering holding is performed by the driver and then the driver easily feels noisy vibration due to the external disturbance. In the present invention, since the gain adjusting section and the dead band section are provided so that the output is small in a range that the steering torque and the assist torque are small, the driver hardly feels this vibration. Since the filter by which the unintentional components for the driver is attenuated is provided, further smooth returning steering feeling can be realized.

Further, in the present invention (the fifth embodiment), in particular, the phase compensation such as a phase lead is performed for the velocity deviation between the target steering angle velocity and the actual steering angle velocity. Thereby, the delay and the disturbance components are removed and then the optimal handle-returning performance can be achieved.

Furthermore, in the present invention (the sixth embodiment), the viscosity coefficient C, which is used for calculating the target steering angle velocity $\omega_0$, is changed or is switched depending on the steering-forward state and the steering-backward state of the steering system. Thereby, both the handle-returning performance and in the steering-forward feeling can be achieved in the high compatibility.

BRIEF DESCRIPTION OF THE DRAWINGS

In the accompanying drawings.

MODE FOR CARRYING OUT THE INVENTION

Figure 1:
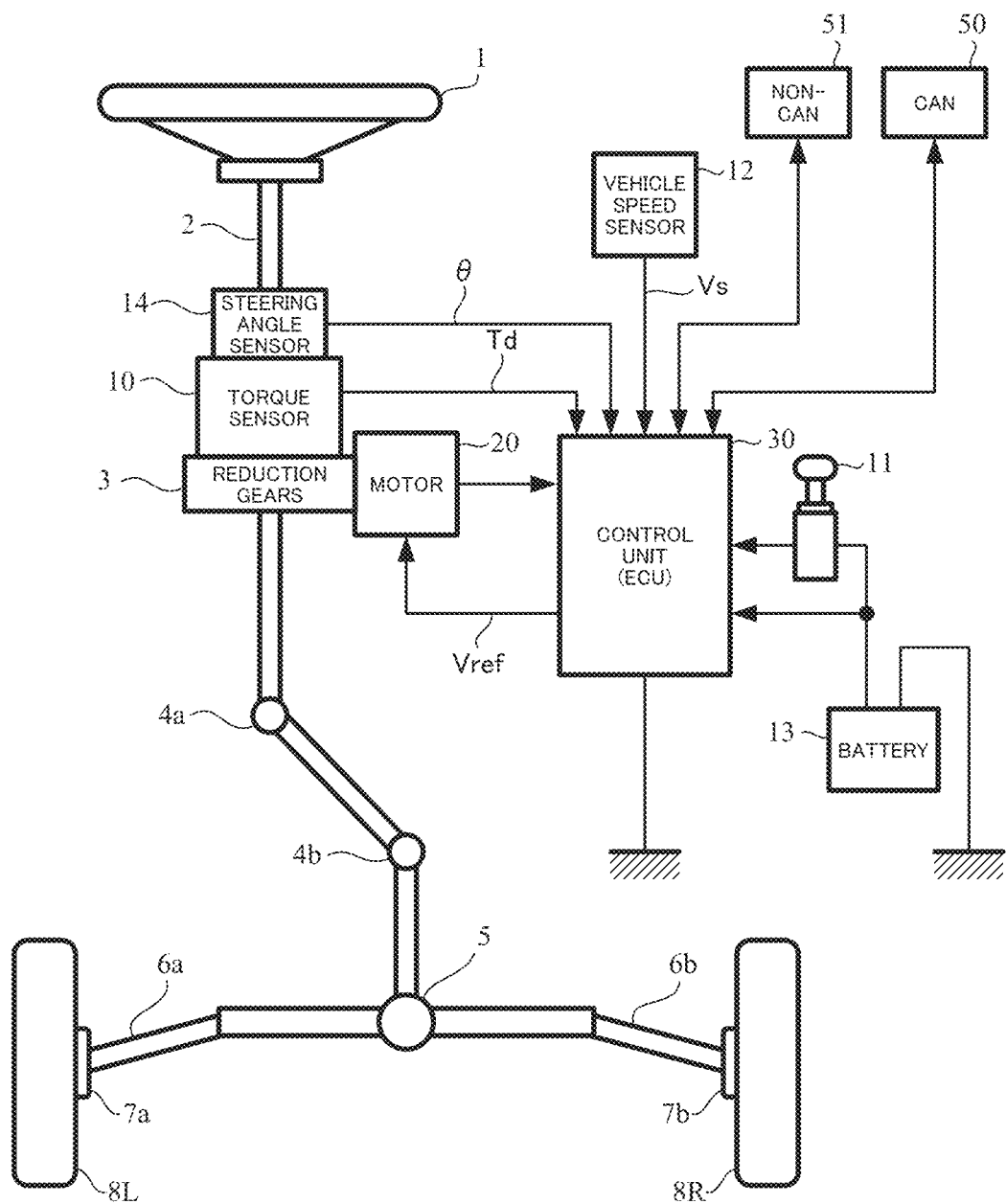
FIG. 1 is a configuration diagram showing a general outline of an electric power steering apparatus.
Figure 2:
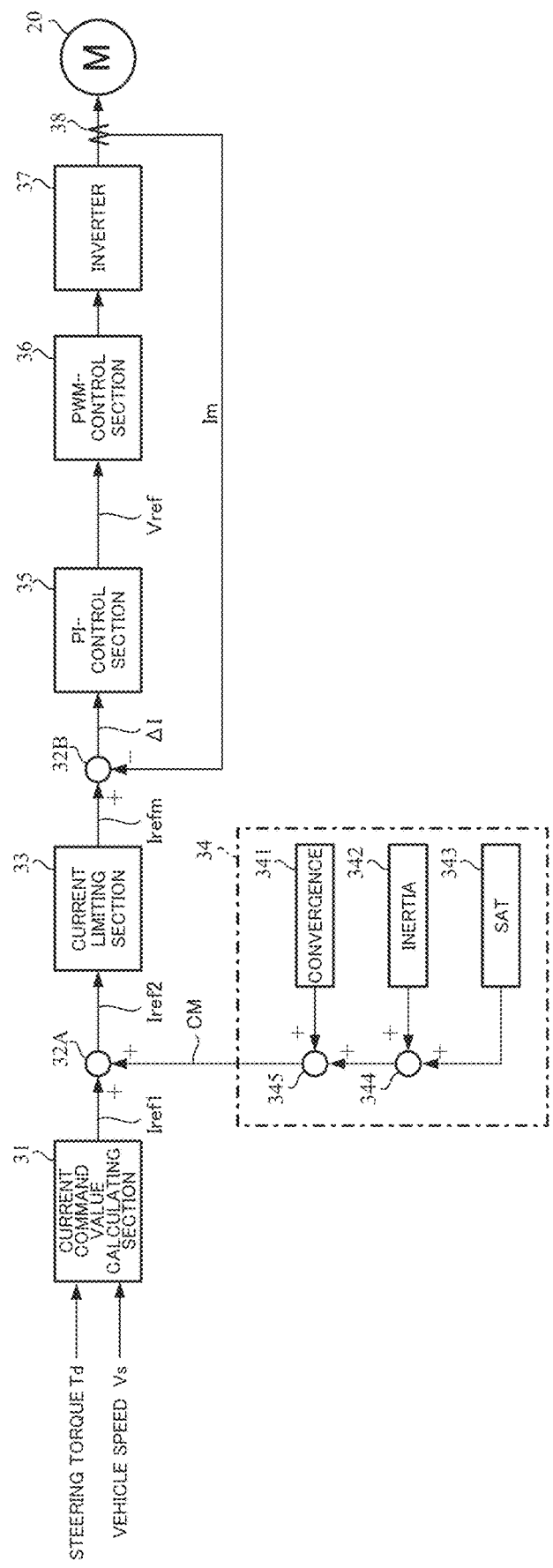
FIG. 2 is a block diagram showing a configuration example of a control system of a conventional electric power steering apparatus.

In an electric power steering apparatus, an operation is prevented due to a friction of reduction gears and a rackand-pinion for transferring an assist torque, a handle does not return to a neutral point even when a running state is returned to a straight running state and then it can be difficult for a vehicle to return to the straight running state. By correcting (compensating) a current command value by means of a handle-returning control current depending on a steering angle and a vehicle speed, it is possible to actively return the handle to the neutral point when the running state is returned to the straight running state.

In the present invention, a target steering angle velocity is calculated by defining a target returning velocity (a target value) depending on a steering angle and a vehicle speed, by adding a target velocity value, which is calculated from a steering torque and an assist torque (a current command value) which are applied to a column shaft, to the target returning velocity, and by multiplying the added result with a transfer characteristic depending on a virtual steering system characteristic. At least one control of a proportional control (a P-control), an integral control (an I-control) and a differential control (a D-control) is performed against a velocity deviation between the target steering angle velocity and an actual steering angle velocity. A feedback control is performed by using the target steering angle velocity that is calculated by correcting the target returning velocity with the target velocity value which is calculated by dividing the steering torque and the assist torque with a viscosity coefficient. As another method, the feedback control is performed by changing or switching the viscosity coefficient depending on a steering-forward state and a steering-backward state, and by using the target steering angle velocity that is calculated by correcting the target returning velocity with the target velocity value which is calculated by dividing the steering torque and the assist torque (the current command value) with the viscosity coefficient. As still another method, the feedback control is performed by calculating the target steering angle velocity after performing a gain adjusting process or a dead band process for decreasing an output, for the steering torque or the assist torque, or both of them (or an addition torque value of the steering torque and the assist torque) when the target velocity value is calculated. As yet another method, the feedback control is performed by phase-compensating the velocity deviation between the target steering angle velocity and the actual steering angle velocity. Thereby, the handle-returning control that the driver feels natural feeling can be realized even in a steering intervention by the driver.

A basic configuration of the present invention relates to the electric power steering apparatus (EPS) that calculates a steering shaft torque by using the steering torque and the current command value (an assist current), and applies the handle-returning control current based on the velocity deviation between the target steering angle velocity and the actual steering angle velocity. A low pass filter (LPF) is interposed in a path that the target steering angle velocity is calculated from the steering shaft torque, so as to attenuate frequencies (for example, 10 [Hz]~) which are equal to or higher than a steering input which the driver mainly intends, or which are equal to or higher than a vehicle motion characteristic based on the steering input. Thereby, the basic configuration of the present invention cuts the vibration by means of noise components and a resonance which the EPS has, unnecessary road noise components, a torque variation and a vehicle variation which the driver does not intend and the like, and provides a smoother handle-returning performance.

A virtual steering system (a vehicle) model in the present invention is a model that calculates the target steering angle velocity $\omega_0$ by applying a steering system transfer function depending on a virtual inertia moment J and a virtual viscosity coefficient C of the steering system to a corrected target returning velocity which is a sum of the target velocity value calculated from the target returning velocity $\omega t$ ($-\omega t$), which is calculated from the steering angle $\theta$ and the vehicle speed Vs, the steering torque Td and the assist torque Ta.

Since the virtual inertia moment J and the virtual viscosity coefficient C of the steering system can be set by using the virtual steering system (the vehicle) model, it is possible to determine a steering system (vehicle) characteristic, arbitrarily. Further, since the steering intervention by the driver, which is also taken into account for the assist torque Ta in the virtual steering system (the vehicle) model, is considered, the smooth handle-returning can be provided even in a state that the driver steers the handle.

Here, assuming that a static friction, a Coulomb friction and an elastic term are not existed in the steering system, an expression of a force balance among a self-aligning torque SAT, the steering torque Td and the assist torque Ta is represented by a below Expression 1.

$$SAT + T_d + T_a = J\frac{d^2\theta}{dt^2} + C\frac{d\theta}{dt} \quad \text{[Expression 1]}$$

where,

"J" is the inertia moment of the virtual steering system and

"C" is the viscosity coefficient of the virtual steering system.

Since the actual steering angle velocity $\omega$ is a time differential of the steering angle $\theta$, a following Expression 2 is satisfied.

$$\omega = d\theta/dt \quad \text{[Expression 2]}$$

Thus, a below Expression 3 is satisfied by considering that the target steering angle velocity is "$\omega_0$".

$$SAT + T_d + T_a = J\frac{d\omega_0}{dt} + C\omega_0 \quad \text{[Expression 3]}$$

Assuming "s" is Laplace operator, a below Expression 4 is obtained. By rearranging the Expression 4, a following Expression 5 is obtained.

$$SAT + T_d + T_a = sJ\omega_0 + C\omega_0 \quad \text{[Expression 4]}$$

$$SAT + T_d + T_a = (sJ + C)\omega_0 \quad \text{[Expression 5]}$$

Accordingly, using the above Expression 5, the target steering angle velocity $\omega_0$ is represented by a following Expression 6.

$$\omega_0 = \frac{SAT + T_d + T_a}{sJ + C} \quad \text{[Expression 6]}$$

By rearranging the Expression 6, a following Expression 7 is obtained.

$$\omega_0 = \frac{1}{\frac{J}{C}s + 1}\left(\frac{SAT}{C} + \frac{T_d + T_a}{C}\right) \quad \text{[Expression 7]}$$

The target steering angle velocity $\omega_0$ is calculated by the above Expression 7. Here, "SAT/C" is the steering angle velocity generated by the self-aligning torque SAT, and it can be considered that "SAT/C" is set as returning steering angle velocity depending on the vehicle characteristics.

$$\frac{1}{\frac{J}{C}s+1} \quad \text{[Expression 8]}$$

The above Expression 8 represents the transfer characteristic calculated from the virtual steering system (the vehicle) model.

$$\frac{T_d + T_a}{C} \quad \text{[Expression 9]}$$

The above Expression 9 represents the steering angle velocity generated by the steering torque Td and the assist torque Ta.

Since the self-aligning torque SAT is generally determined by the steering angle θ and the vehicle speed Vs, the returning steering angle velocity is configured so as to be set depending on the vehicle speed Vs and the steering angle θ. A following Expression 10 is obtained by rearranging the Expression 7 by using the target steering angle velocity $\omega_0$ and the returning steering angle velocity $\omega_r$. The steering torque Td can be detected by a torque sensor and the assist torque Ta can be calculated from the current command value in considering a multiplying value Kt that means "a motor torque constant" times "a gear ratio" times "gear efficiency". The steering angle velocity $\omega_1$, which is generated by the steering torque Td and the assist torque Ta, is calculated by dividing a sum of the steering torque Td and the assist torque Ta by the virtual steering viscosity coefficient C. The target steering angle velocity $\omega_0$ is obtained by multiplying an addition value, which is added the returning steering angle velocity $\omega_r$ to the steering angle velocity $\omega_1$, by the transfer function of the Expression 8.

In the present invention, although the PID-control (at least the PI-control) is performed depending on the velocity deviation between the target steering angle velocity $\omega_0$ and the actual steering angle velocity $\omega$, the optimal handle-returning control performance is achieved by phase-compensating the velocity deviation before performing the PID-control.

$$\omega_0 = \frac{1}{\frac{J}{C}s+1}\left(\omega_r + \frac{T_d + T_a}{C}\right) \quad \text{[Expression 10]}$$

In a case of performing a phase lead compensation as the phase compensation, a phase delay due to the filter (not shown) to remove the noise and the like for the actual steering angle velocity in a preceding stage, the filter in a calculating path of the second term of the Expression 10, and the virtual steering system (the vehicle) model, can be recovered. Thereby, the driver can obtain a comfortable handle-returning performance. Further, in a case of performing a phase delay compensation including a first-order delay, since the deviation in the high frequency is restricted, the smooth control output can be realized. Thereby, in the substantially straight running, even when the driver lightly grips the handle and the like, the driver hardly feels the noisy vibration. Furthermore, the phase lead compensation and the phase delay compensation may be combined. In this case, since it is generally considered that the steering frequency of the driver and the vehicle motion due to the steering of the driver are up to about 10 [Hz], the characteristics of the phase lead filter and the phase delay filter are set so that the phase is not delayed in the frequency having 10 [Hz] or less, and the gain of the phase delay filter is reduced in the frequency band which is higher than 10 [Hz]. Further, the phase lead compensation, the phase delay compensation and a first order delay compensation may be combined as a multistage filter.

When the viscosity coefficient C in the above Expression 10 is smaller, the steering angle velocity $\omega_1$ generated by the steering torque Td and the assist torque Ta is larger and a ratio of the steering angle velocity $\omega_1$ to the target steering angle velocity can relatively be larger. Consequently, the operation of the driver is easily reflected on the target steering angle velocity. Thereby, since the control output is easily varied due to the steering by the driver, the driver can steer the handle without occurring unnatural resistant feeling even when the handle-returning control is implemented.

On the other hand, when the viscosity coefficient C is larger, the ratio of the returning target velocity $\omega_r$ to the target steering angle velocity is relatively larger. Thereby, an influence due to the steering by the driver becomes small and the stable handle-returning can be realized. For example, when the viscosity coefficient C is smaller in the steering-forward and the viscosity coefficient C is larger in the steering-backward, the driver can steer the handle without resistance feeling in the steering-forward. In the steering-backward, even when the driver lightly grips the handle, the stable handle-returning can be realized.

At first, a basic concept of the present invention will be described.

Although the steering torque Td and the assist torque Ta include the variation components due to the road surface disturbance and the like, these are not derived from the intention of the driver. When these are reflected on the target steering angle speed $\omega_0$, the behavior of the vehicle can be out of harmony with the intention of the driver and the driver can feel uncomfortable. Thus, in the present invention, the filter (LPF), which attenuates frequency components which are higher than a steering input which the driver intends, or which are higher than a vehicle motion characteristic (yaw, roll and the like) based on the steering input, is provided at a subsequent stage of the target velocity value $\omega_1$ which is calculated by using the steering torque Td and the assist torque Ta. Thereby, the stable control, the smooth returning and the steering feeling consistent with the intention of the driver are realized. Generally, since it is considered that the steering frequency of the driver and the vehicle motion due to the steering by the driver are up to about 10 [Hz], the filter has an attenuation characteristic that reduces 3 [dB] or more from the gain 0 [dB] at 10 [Hz] as a filter characteristic.

Figure 3:
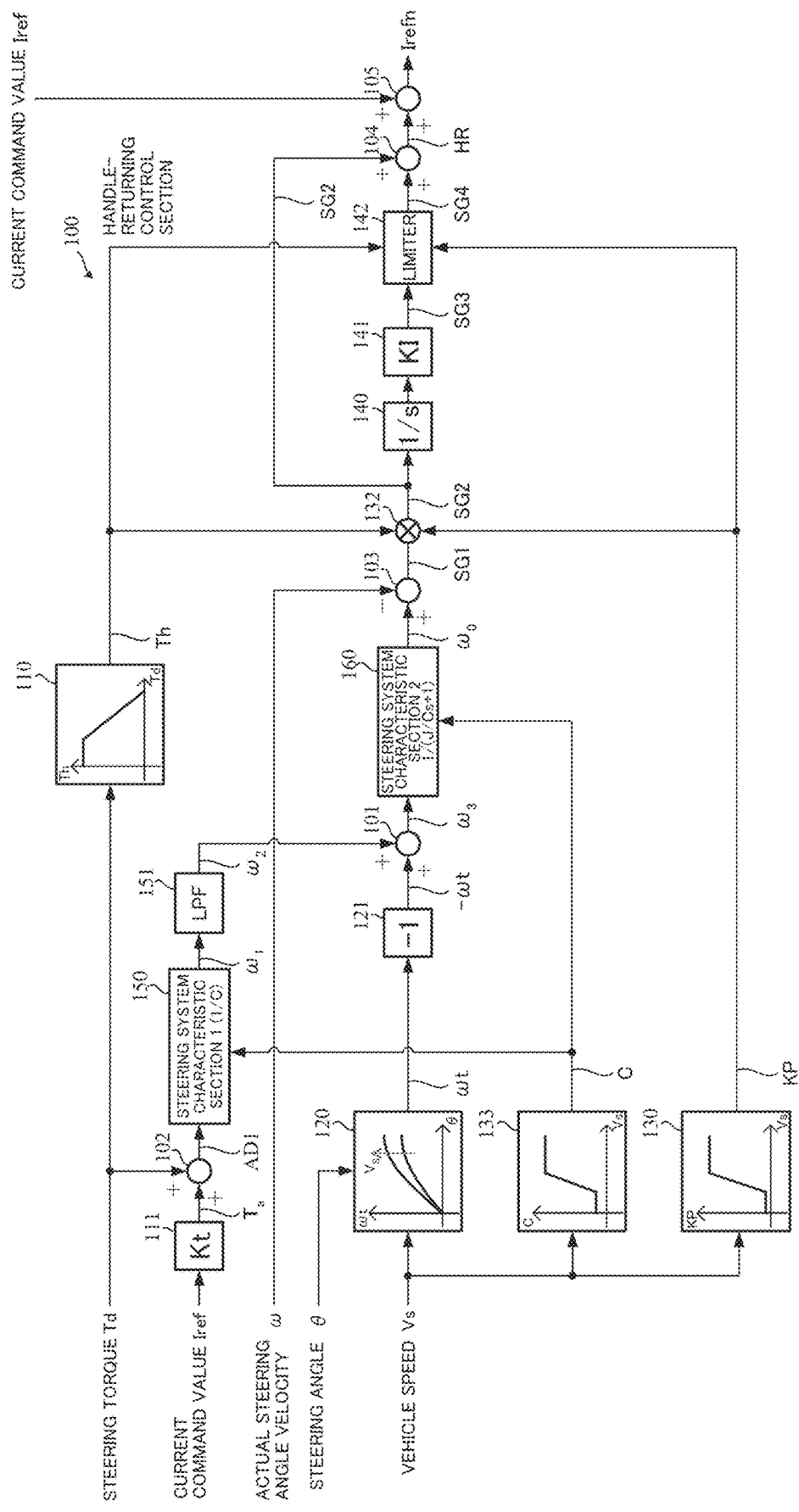
FIG. 3 is a block diagram showing a basic configuration example of the present invention.

FIG. 3 shows a configuration example of a handle-returning control section 100 that is a base of the present invention. The steering torque Td is inputted into a steering torque gain section 110 outputting a steering torque gain Th and an adding section 102. Further, the steering angle θ is inputted into a target returning velocity calculating section 120 that calculates the target returning velocity $\omega t$. The vehicle speed Vs is inputted into the target returning velocity calculating section 120, a vehicle speed gain section 130 outputting a vehicle speed gain KP, and a viscosity coefficient outputting section 133 outputting the viscosity coefficient C. The viscosity coefficient C from the viscosity coefficient outputting section 133 is inputted into a steering system characteristic section 150 and a steering system characteristic section 160. The actual steering angle velocity ω is subtracting-inputted into a subtracting section 103. The current command value Iref is multiplied by the multiplying value Kt that indicates "the motor torque constant" times "the gear ratio" times "the gear efficiency", and the assist torque Ta that is the above multiplied result is inputted into the adding section 102. Accordingly, an addition result of the adding section 102 is a total torque value of the steering torque Td and the assist torque Ta, and the total torque value is inputted into a steering system characteristic section 150 that has a transfer function "1/C". The target velocity value $\omega_1$ from the steering system characteristic section 150 is inputted into a low pass filter (LPF) 151. The target velocity value $\omega_2$ whose the components at a range of frequency (for example, 10 [Hz]~), which are equal to or higher than the steering input of the driver, or which are equal to or higher than the vehicle motion characteristic based on the steering input, are attenuated at the low pass filter (LPF), is inputted into an adding section 101.

The target returning velocity ωt that is calculated at the target returning velocity calculating section 120 based on the steering angle θ and the vehicle speed Vs, is inverted a sign (−ωt) at the inverting section 121 and is inputted into the adding section 101. A target velocity value $\omega_3$ that is an addition result at the adding section 101 is inputted into the steering system characteristic section 160 that has a transfer function "1/(J/Cs+1)". The steering system characteristic section 160 determines the transfer function from the inertia moment J and the viscosity coefficient C in accordance with the above Expression 8, and outputs the target steering angle velocity $\omega_0$. The target steering angle velocity $\omega_0$ is adding-inputted into the subtracting section 103. The steering angle velocity ω is subtracting-inputted into the subtracting section 103. The velocity deviation SG1 between the target steering angle velocity $\omega_0$ and the steering angle velocity ω is calculated at the subtracting section 103 and is inputted into a multiplying section 132.

Further, the steering torque gain Th that is outputted from the steering torque gain section 110 is inputted into the multiplying section 132 and a limiter 142. The vehicle speed gain KP from the vehicle speed gain section 130 is also inputted into the multiplying section 132 and the limiter 142.

The velocity deviation SG1 is multiplied with the steering torque gain Th and the vehicle speed gain KP at the multiplying section 132, and the above multiplied result is outputted as a handle-returning control gain SG2 (a proportional control value). The handle-returning control gain SG2 is inputted into an adding section 104 and an integral control section which comprises an integral section 140 and an integral gain section 141 for a characteristic improvement, and an integral control value is inputted into the limiter 142. An output of the integral control value is limited depending on the steering torque gain Th and the vehicle speed gain KP at the limiter 142. A limited signal SG4 is added to the handle-returning control gain SG2 at the adding section 104, and is outputted as the handle-returning control current HR. The integral at the integral section 140 compensates a low steering torque range that is easily influenced by the friction. Especially, the integral is effective in the range that is largely affected by the friction with no hands state. The current command value Iref is added to the handle-returning control current HR at an adding section 105 and is corrected (compensated). A corrected compensation current command value Irefn is inputted into a motor driving system.

A handle-returning control gain calculating section comprises the steering torque gain section 110, the vehicle speed gain section 130, the subtracting section 103 and the multiplying section 132, a steering system characteristic section comprises the viscosity coefficient outputting section 133, the steering system characteristic section 150 and the steering system characteristic section 160, and a handle-returning control current calculating section comprises the integral section 140, the integral gain section 141, the limiter 142 and the adding section 104.

Figure 4:
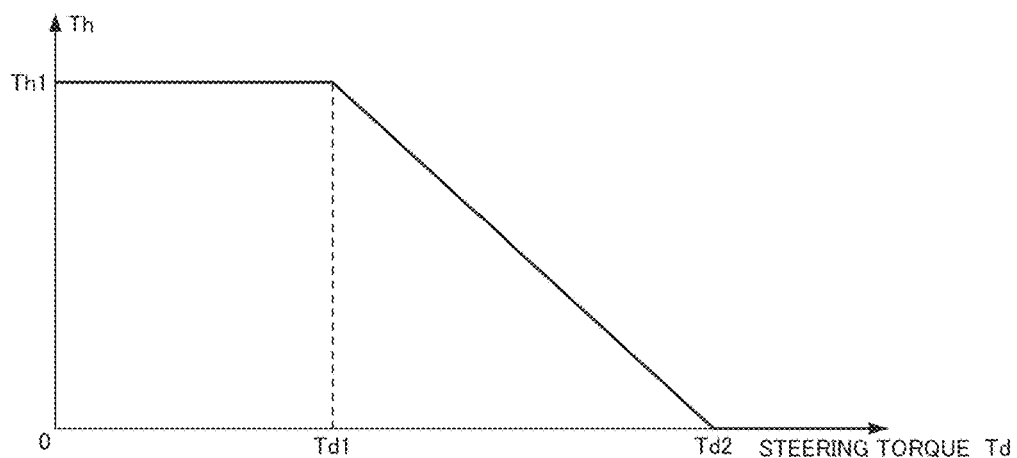
FIG. 4 is a characteristic diagram showing an output gain example of a steering torque gain section.
Figure 5A:
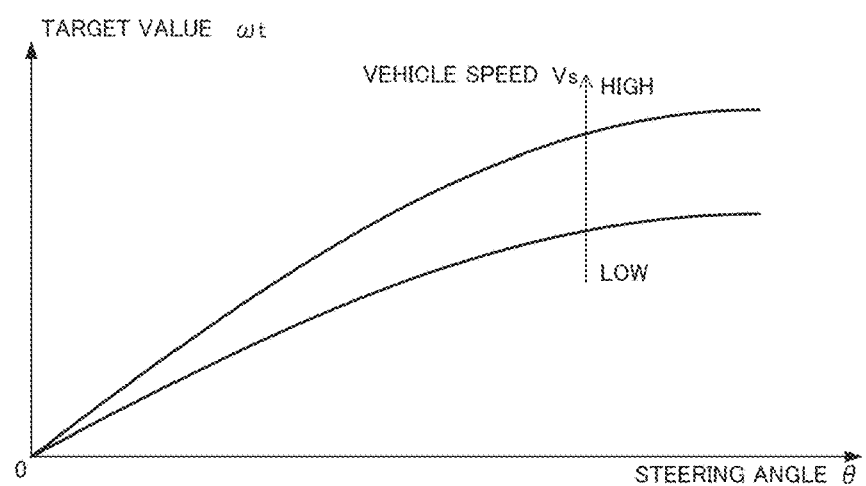
FIGS. 5A and 5B are characteristic diagrams showing output examples of a target returning velocity calculating section.
Figure 5B:
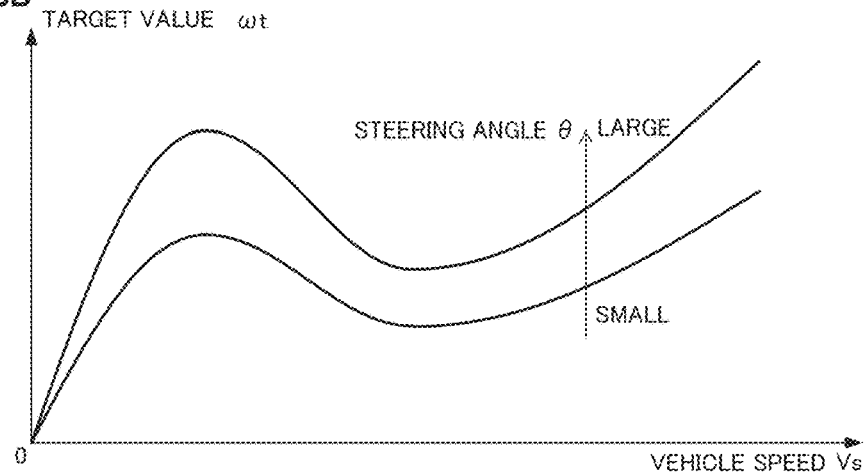
Figure 6:
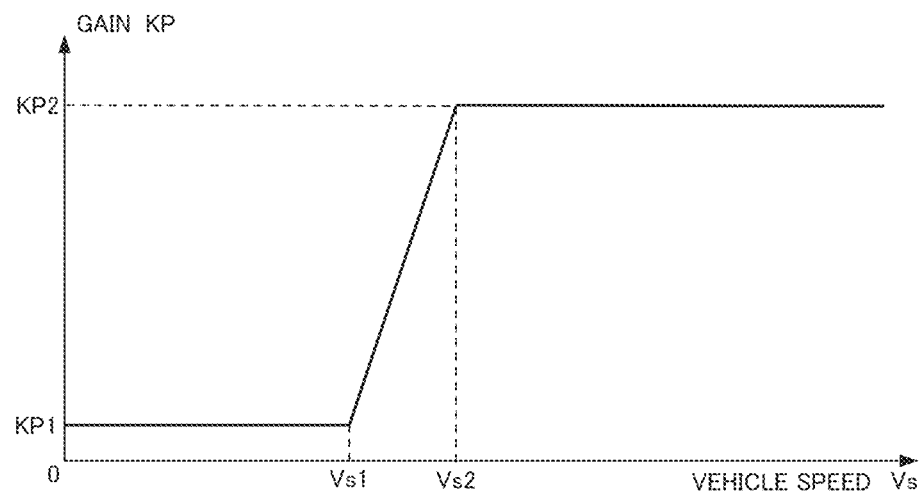
FIG. 6 is a characteristic diagram showing an output example of a vehicle speed gain section.

The steering torque gain section 110 has a characteristic as shown in FIG. 4, outputs a constant value gain Th1 when the steering torque Td is from zero to a torque value Td1, and has an output characteristic that the gain gradually decreases when the steering torque Td is larger than the torque value Td1 and the gain is zero when the steering torque Td is equal to or larger than the torque value Td2. Although the gain linearly decreases in FIG. 4, the gain may nonlinearly decrease. Further, the target returning velocity calculating section, in which the vehicle speed Vs serves as a parameter, has an output characteristic that the target returning velocity ωt gradually increases when the steering angle θ is larger, as shown in FIG. 5A. As shown in FIG. 5B, the target returning velocity ωt varies with the output characteristic that the target returning velocity ωt does not continuously and gradually increase when the vehicle speed is higher. That is, when the vehicle speed Vs is higher, the target returning velocity ωt gradually increases, once decreases, and increases again. The vehicle speed gain section 130 has a characteristic shown in FIG. 6 that the gain KP is a small constant gain KP1 when the vehicle speed is from zero to at least a vehicle speed Vs1, gradually increases when the vehicle speed is equal to or higher than the vehicle speed Vs1, and is a large constant gain KP2 when the vehicle speed is equal to or higher than a vehicle speed Vs2. However, the characteristic of the gain KP is not limited to such a characteristic.

Figure 7:
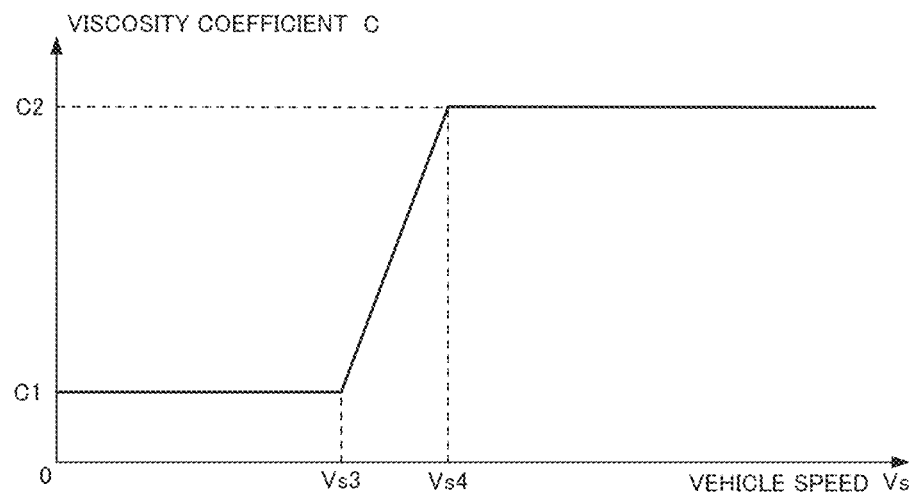
FIG. 7 is a characteristic diagram showing an output example of a viscosity coefficient outputting section.

The viscosity coefficient outputting section 133, in which the viscosity coefficient C depending on the vehicle speed Vs is changeable, has a characteristic as shown in FIG. 7 that the viscosity coefficient C is a small constant viscosity coefficient C1 when the vehicle speed is from zero to at least a vehicle speed Vs3, gradually increases when the vehicle speed is equal to or higher than the vehicle speed Vs3 and is equal to or slower than a vehicle speed Vs4 (>Vs3), and is a large constant viscosity coefficient C2 when the vehicle speed is equal to or higher than the vehicle speed Vs4. However, the characteristic of the viscosity coefficient C is not limited to such a characteristic. The viscosity coefficient C may nonlinearly increase in a range that the vehicle speed Vs is equal to or higher than the vehicle speed Vs3 and is equal to or slower than the vehicle speed Vs4.

In such a basic configuration, the operation example will be described with reference to flowcharts of FIGS. 8 and 9.

At first, the steering torque Td, the current command value Iref, the vehicle speed Vs, the steering angle θ and the actual steering angle velocity ω, are inputted (read) (Step S1), and the steering torque gain section 110 outputs the steering torque gain Th (Step S2). The gain section 111 calculates the assist torque Ta by multiplying the current command value Iref with the multiplying value Kt that the motor torque constant and the like are multiplied (Step S3). The steering torque Td is added to the assist torque Ta at the adding section 102 and the torque value AD1 that is the above sum value is inputted into the steering system characteristic section 150 (Step S4).

The target returning velocity calculating section 120 calculates the target returning velocity ωt based on the inputted steering angle θ and vehicle speed Vs (Step S10), the inverting section 121 performs a sign inversion of the target returning velocity ωt (Step S11) and the inverted target returning velocity "−ωt" is inputted into the adding section 101. The vehicle speed gain section 130 outputs the vehicle speed gain KP in accordance with the vehicle speed Vs (Step S12). The viscosity coefficient outputting section 133 outputs the viscosity coefficient C in accordance with the vehicle speed Vs (Step S13). The viscosity coefficient C is inputted into the steering system characteristic section 150 and the steering system characteristic section 160. The steering system characteristic section 150 divides the torque value AD1 by the viscosity coefficient C (Step S14) and outputs the target velocity value $\omega_1$ (Step S15). The target velocity value $\omega_1$ is inputted into the LPF 151 and is filter-processed (Step S16).

The target velocity value $\omega_2$ that is filter-processed at the LPF 151 is added to the target returning velocity "−ωt" at the adding section 101 and the target velocity value $\omega_3$ that is the above addition result is inputted into the steering system characteristic section 160. The target steering angle velocity $\omega_0$ is outputted from the steering system characteristic section 160 (Step S30). The velocity deviation SG1 between the target steering angle velocity $\omega_0$ and the actual steering angle velocity co is calculated at the subtracting section 103 (Step S31). The velocity deviation SG1 is inputted into the multiplying section 132, is multiplied with the steering torque gain Th and the vehicle speed gain KP (Step S32). The handle-returning control gain SG2 is calculated by the above multiplication. The handle-returning control gain SG2 is integral-processed at the integral control section 140 (Step S33), further the integral result is multiplied with an integral gain KI at the integral gain section 141 (Step S34) and then a handle-returning control gain SG3 is outputted. The handle-returning control gain SG3 is inputted into the limiter 142 and is limiting-processed at the limiter 142 by using the steering torque gain Th and the vehicle speed gain KP (Step S35).

A handle-returning control gain SG4 that is limiting-processed at the limiter 142 is inputted into the adding section 104 and is added to the handle-returning control gain SG2 (Step S36), and then the handle-returning control current HR is outputted. The current command value Iref is added to the handle-returning control current HR at the adding section 105 and is corrected (Step S37), and then the compensated current command value Irefn is outputted (Step S38).

Figure 10:
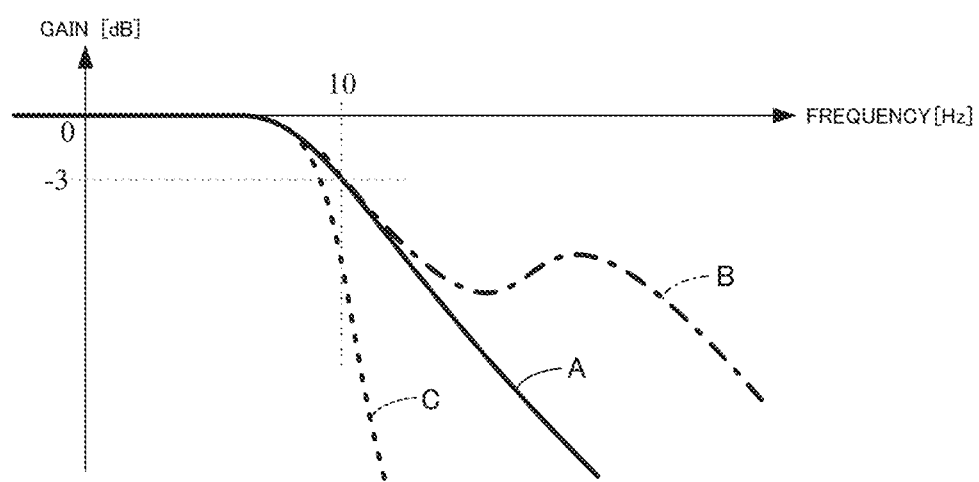
FIG. 10 is a gain diagram showing a characteristic example of a filter.

The filter (LPF), which attenuates the frequency components being higher than the steering input which the driver intends, or being higher than the vehicle motion characteristic (the yaw, the roll or the like) based on the steering input, is provided at a subsequent stage in which the target velocity value $\omega_1$ is calculated based on the steering torque Td and the assist torque Ta. Thereby, the stable control, the smooth returning and the steering feeling consistent with the intention of the driver are realized. Generally, since it is considered that the steering frequency of the driver and the vehicle motion due to the steering by the driver are up to about 10 [Hz], a filter characteristic of the LPF 151 that is used in the present invention may have an attenuation characteristic that reduces 3 [dB] or more from the gain 0 [dB] at 10 [Hz], as shown in FIG. 10. The filter characteristic is not limited to a characteristic "A" and the characteristic "B" or "C" may be used as the LPF 151.

Various embodiments according to the present invention will be described with reference to the drawings.

In the above basic configuration, although the steering torque Td and the assist torque Ta include variation components due to the road surface disturbance and the like, these are not derived from the intention of the driver. When these are reflected on the target steering angle speed $\omega_0$, the behavior of the vehicle can be out of harmony with the intention of the driver and the driver can feel uncomfortable. In order to reduce the uncomfortable feeling by the variation components that the intention of the driver is not represented, in a minute region that the steering torque or the assist torque, or both of them (or the addition torque value of the steering torque and the assist torque) are small, the dead band section or the adjusting section in which the gain is adjusted, is provided so that the output is small. Thereby, the calculated target steering angle velocity is stabilized and the smooth returning steering feeling by the handle-returning control is realized. Particularly, in the substantially straight running, the lightly steering holding is performed by the driver and then the driver easily feels the noisy vibration by the external disturbances. By being provided with the gain adjusting section, in which the gain is adjusted, and the dead band section so that the output is small in the above minute region, the driver can hardly feel this vibration.

In the first to the fourth embodiments of the present invention, the dead band section or the gain adjusting section in which sensitivity is reduced, is added to the above basic configuration so that the output is a small in the minute region that either the assist torque (the torque value in which the current command value Iref is multiplied with a value "the motor torque constant" times "the reduction gear ratio" times "the gear efficiency") for calculating/correcting the target steering angle velocity or the steering torque Td, both of them, or the torque value that is the addition result of the assist torque and the steering torque, is small. Thereby, the unnecessary correction of the target steering angle velocity due to the external disturbance and the like is prevented and smoother handle-returning performance is realized.

Figure 11:
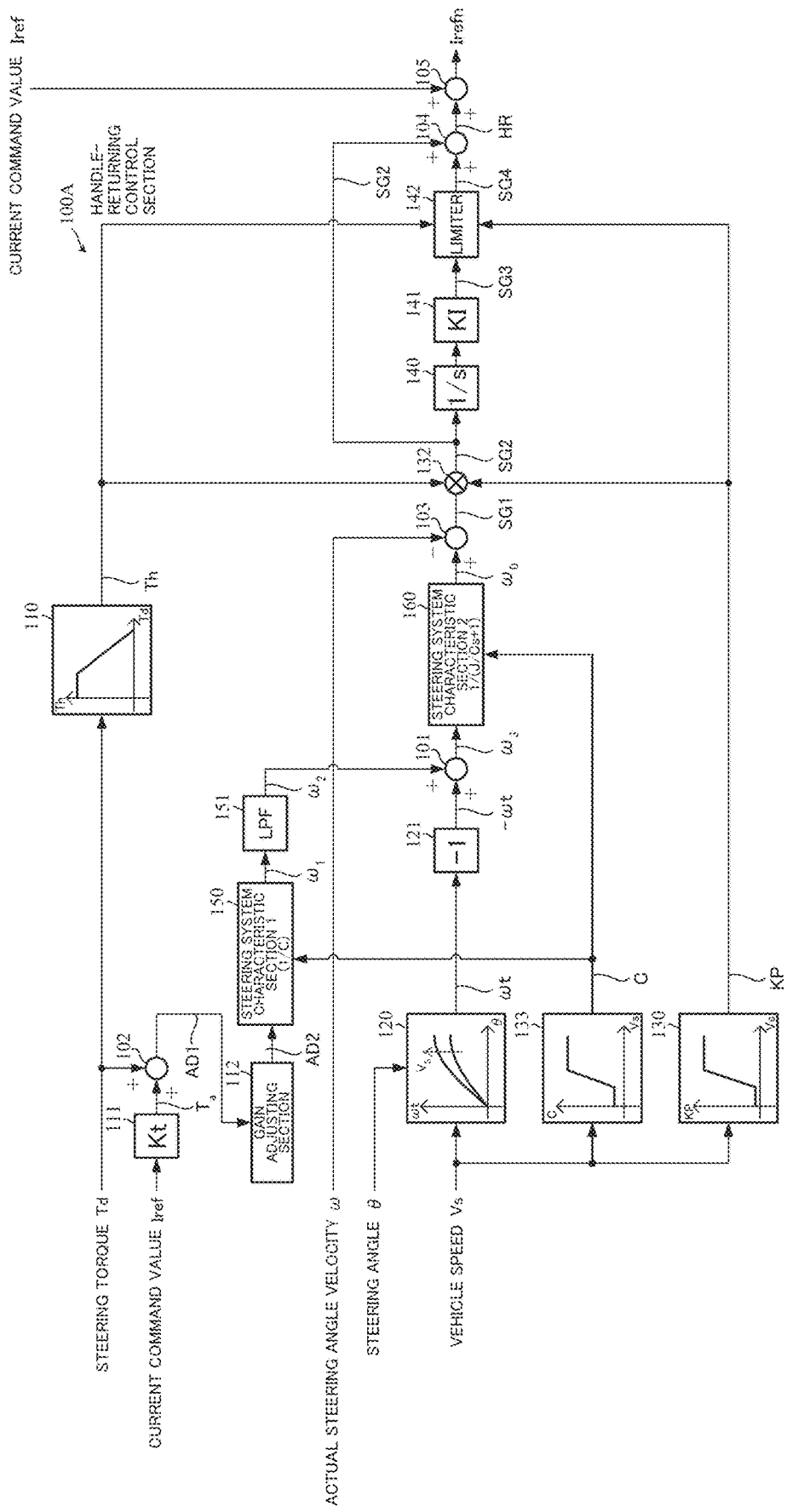
FIG. 11 is a block diagram showing a configuration example of the present invention (the first embodiment)

FIG. 11 shows the configuration example of the handle-returning control section 100A according to the present invention (the first embodiment). Since FIG. 11 is corresponding to FIG. 3, the same members are designated with the same numeral and the description is omitted. In the first embodiment, the LPF 151 may or may not be provided.

The gain adjusting section 112 is provided in the first embodiment. The torque value AD1 that is the addition result at the adding section 102 is inputted into the gain adjusting section 112 and the torque value AD2 whose gain is adjusted at the gain adjusting section 112 is inputted into the steering system characteristic section 150.

Figure 12A:
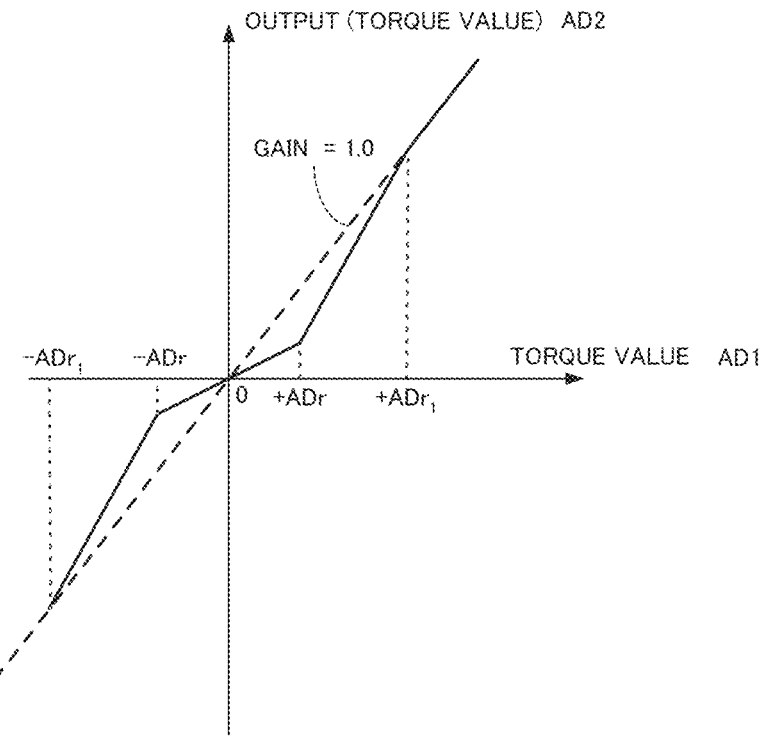
FIGS. 12A and 12B are characteristic diagrams showing characteristic examples of a gain adjusting section.

As shown in FIG. 12A, the output AD2 of the gain adjusting section 112 is smaller than a value that the gain is equal to "1.0" which the output is equal to the input, in a region that the torque value AD1 is within "±ADr". Here, the predetermined value ADr is set up to about 11 [Nm] of the addition torque, considering in a region that about 1 [Nm] of the steering torque that the driver relatively feels the external disturbance from the road surface, is added to about 10 [Nm] of the assist torque in the low vehicle speed. In a region that the torque value AD1 is out of the range of "±ADr", the output AD2 is gradually approximate to the characteristic whose gain is equal to "1.0". In a region that the torque value AD1 is out of the range of "±ADr1", the torque value AD2 having the characteristic (the correction) whose gain is equal to "1.0" is outputted.

Figure 13:
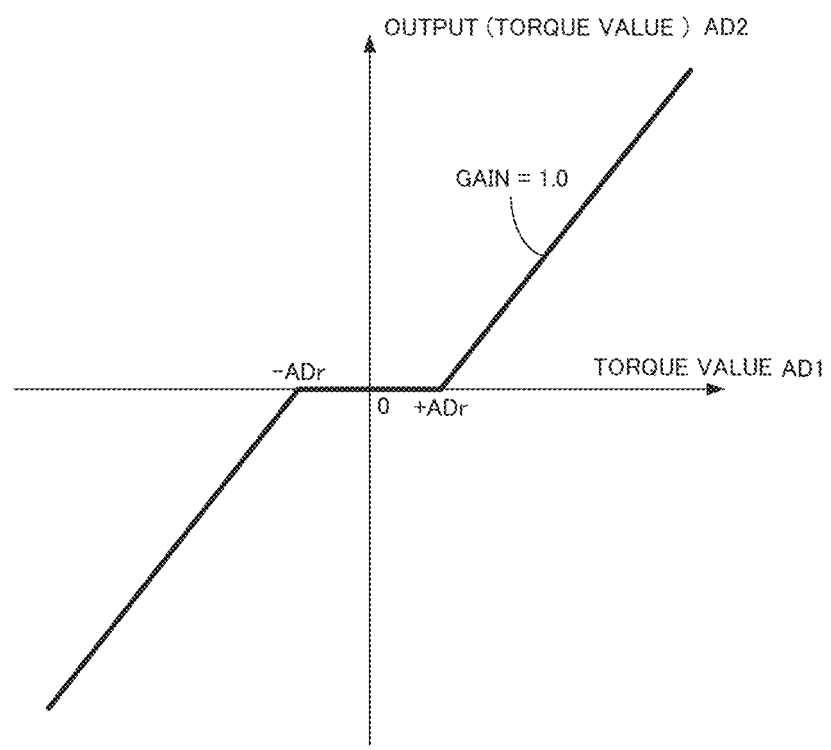
FIG. 13 is a characteristic diagram showing a characteristic example of a dead zone section.

Here, the gain is adjusted by using respective three straight lines in both positive and negative regions of the torque value AD1. However, in the region that the torque value AD1 is within "±ADr1", the output AD2 may vary nonlinearly. Further, in the region that the torque value AD1 is out of the range of "±ADr1", the characteristic whose gain is equal to "1.0" is exemplified. However, the output AD2 may have the smaller value than the output value that the gain is equal to "1.0". The dead band section having a minute dead band whose characteristic example is shown in FIG. 13, instead of the gain adjusting section 112, may be provided in the correction to the torque value AD1. Alternatively, if the outputted torque value AD1 is smaller than the value that the gain is equal to "1.0" in the region that the torque value AD1 is small, any characteristic line may be used. The assist torque is determined by performing a vehicle test so that the assist torque becomes the steering torque that is in harmony with the SAT which is varied depending on the vehicle speed. Since the assist torque is varied depending on the vehicle speed, the ADr and the output value AD2 corresponding to the value ADr are determined by performing the vehicle test from the low vehicle speed to the high vehicle speed, and keeping the balance of the disturbance restriction and the returning performance.

Figure 12B:
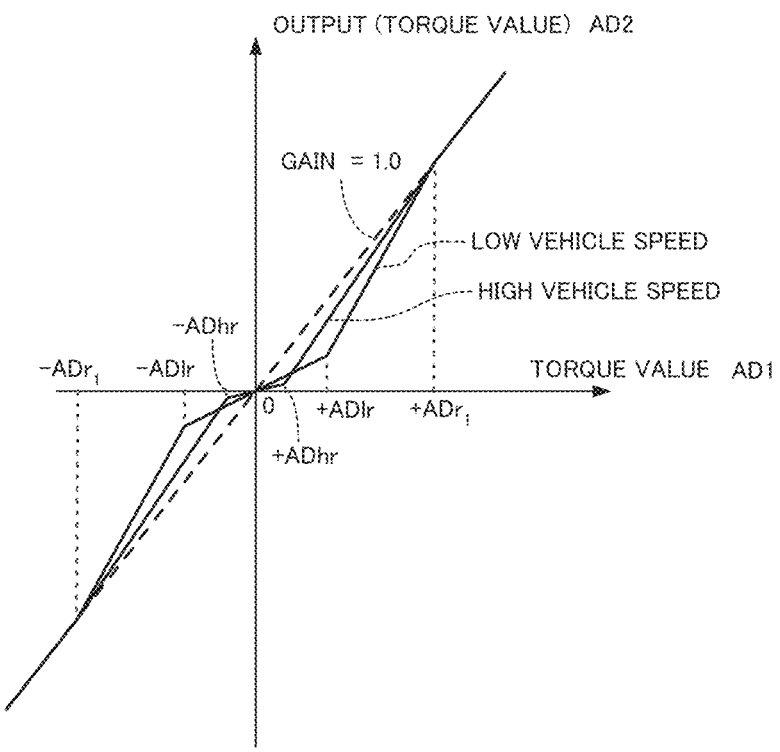

In order to decrease the time and the work of the vehicle test, the vehicle speed is inputted into the gain adjusting section 112 or the dead band section and then the value ADr and the output value AD2 corresponding to the value ADr may step-wisely or continuously be varied depending on the vehicle speed. Generally, since the assist torque is smaller when the vehicle speed is higher, the value ADr can be set smaller when the vehicle speed is higher. The setting example is shown in FIG. 12B. In the gain adjusting section 112, the vehicle speed Vs is inputted as a parameter. The value ADr in the high vehicle speed is "ADhr", the value ADr in the low vehicle speed is "ADlr", and the relationship "ADhr<ADlr" is satisfied. In the vehicle speed between the high vehicle speed and the lower vehicle speed, the output value AD2 can be calculated by using a generally known interpolation method. Actually, since the value ADr is determined by performing the vehicle test and keeping the balance of the returning performance, the characteristic that the value Adr is smaller when the vehicle speed is higher, is not always satisfied. The torque value AD2 is inputted into the steering system characteristic section 150 that has the transfer function "1/C".

Figure 14:
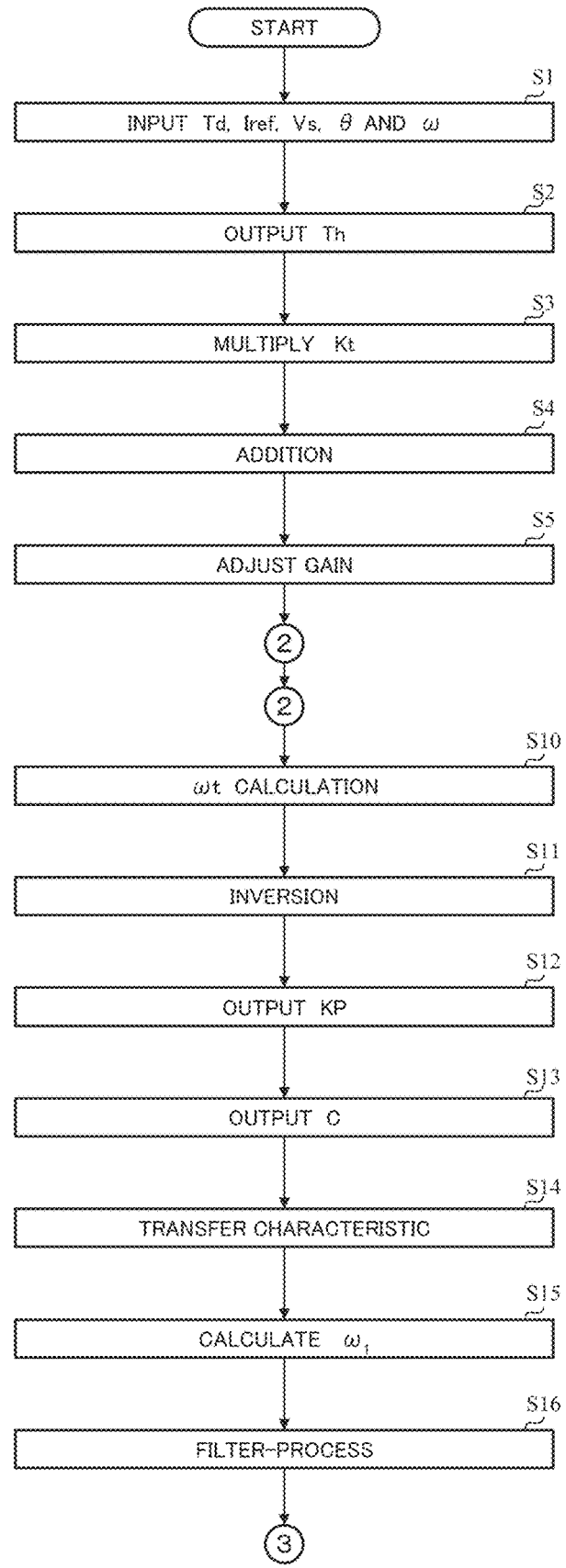
FIG. 14 is a part of a flowchart showing an operation example of the first embodiment according to the present invention.
Figure 15:
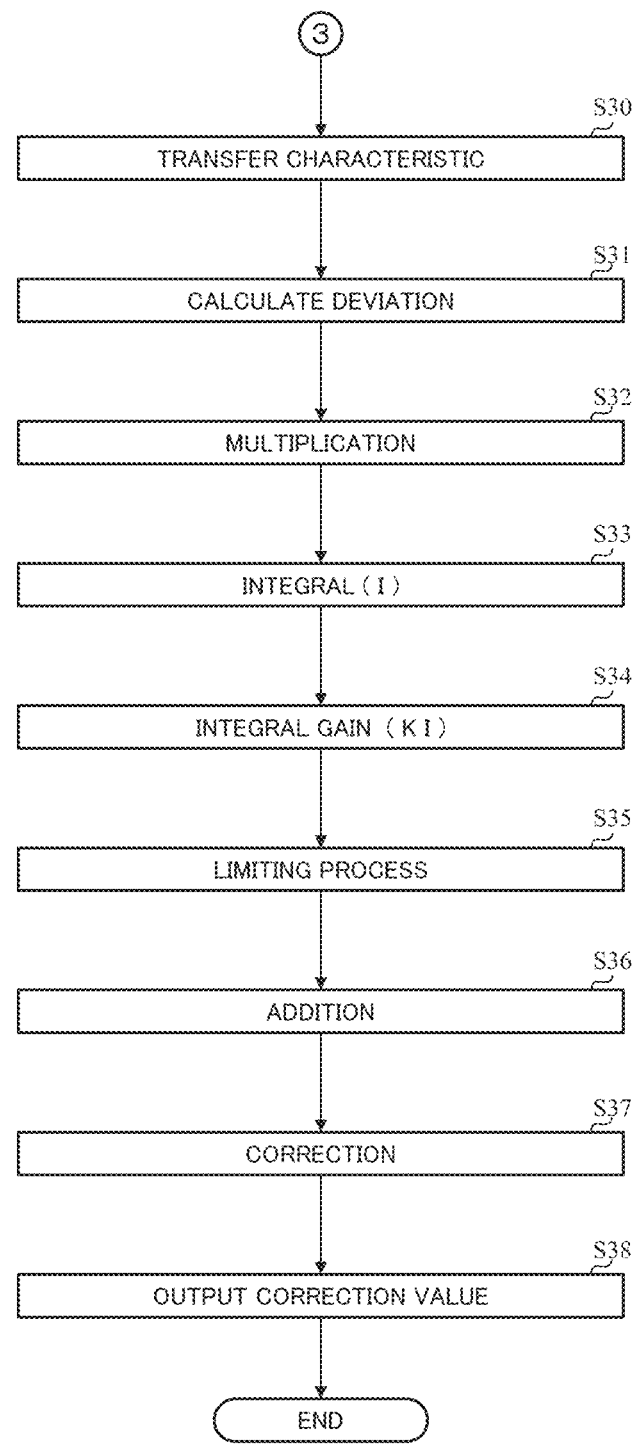
FIG. 15 is another part of a flowchart showing an operation example of the first embodiment according to the present invention.

In such a configuration, the operation example (the first embodiment) will be described with reference to flowcharts of FIGS. 14 and 15.

At first, the steering torque Td, the current command value Iref, the vehicle speed Vs, the steering angle θ and the actual steering angle velocity ω are inputted (read) (Step S1), and the steering torque Td is inputted into the steering torque gain section 110 and the adding section 102. The steering torque gain section 110 outputs the steering torque gain Th (Step S2). The gain section 111 calculates the assist torque Ta by multiplying the current command value Iref with the multiplying value Kt that indicates "the motor torque constant" times "the gear ratio" times "the gear efficiency" (Step S3). The steering torque Td is added to the assist torque Ta at the adding section 102, and then the torque value AD1 is calculated (Step S4). The torque value AD1 is adjusted the gain at the gain adjusting section 112 and is inputted into the steering system characteristic section 150 (Step S5). In a case that the dead band section is provided instead of the gain adjusting section 112, the dead band-processed torque value AD2 is inputted into the steering system characteristic section 150.

Further, the target returning velocity calculating section 120 calculates the target returning velocity ωt based on the inputted steering angle θ and vehicle speed Vs (Step S10) and the inverting section 121 performs the sign inversion of the target returning velocity ωt (Step S11). The vehicle speed gain section 130 outputs the vehicle speed gain KP in accordance with the vehicle speed Vs (Step S12). The viscosity coefficient outputting section 133 outputs the viscosity coefficient C in accordance with the vehicle speed Vs (Step S13). The viscosity coefficient C is inputted into the steering system characteristic section 150 and the steering system characteristic section 160. The steering system characteristic section 150 divides the torque value AD2 by the viscosity coefficient C (Step S14) and outputs the target velocity value $\omega_1$ (Step S15). The target velocity value $\omega_1$ is inputted into the LPF 151 and is filter-processed (Step S16).

The target returning velocity "−ωt" is added to the filter-processed target velocity value $\omega_2$ at the adding section 101 and the target velocity value $\omega_3$ that is the above addition result is inputted into the steering system characteristic section 160. The target steering angle velocity $\omega_0$ is outputted from the steering system characteristic section 160 (Step S30). The velocity deviation SG1 between the target steering angle velocity $\omega_0$ and the actual steering angle velocity ω is calculated at the subtracting section 103 (Step S31). The velocity deviation SG1 is inputted into the multiplying section 132, is multiplied with the steering torque gain Th and the vehicle speed gain KP (Step S32). The handle-returning control gain SG2 is calculated by the above multiplication. The handle-returning control gain SG2 is integral-processed at the integral control section 140 (Step S33), further the integral result is multiplied with an integral gain KI at the integral gain section 141 (Step S34) and then a handle-returning control gain SG3 is outputted. The handle-returning control gain SG3 is inputted into the limiter 142 and is limiting-processed at the limiter 142 by using the steering torque gain Th and the vehicle speed gain KP (Step S35).

The handle-returning control gain SG4 that is limiting-processed at the limiter 142 is inputted into the adding section 104 and is added to the handle-returning control gain SG2 (Step S36), and then the handle-returning control current HR is outputted. The current command value Iref is added to the handle-returning control current HR at the adding section 105 and is corrected (Step S37), and then the compensated current command value Irefn is outputted (Step S38).

Next, the handle-returning control section 100B of the second embodiment according to the present invention will be described with reference to FIG. 16. Even in the second embodiment, the LPF 151 may or may not be provided.

Figure 16:
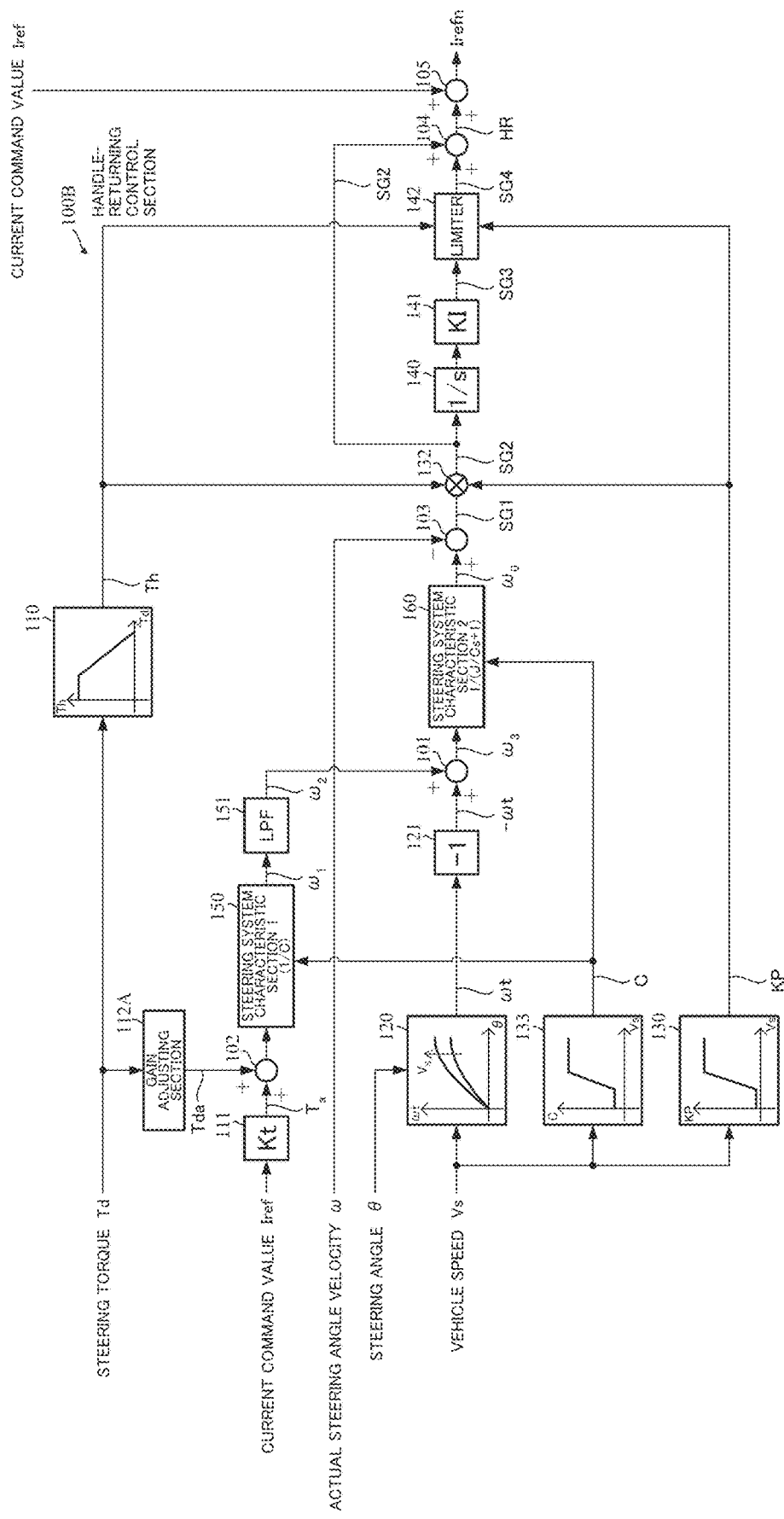
FIG. 16 is a block diagram showing a configuration example of the present invention (the second embodiment)
Figure 17:
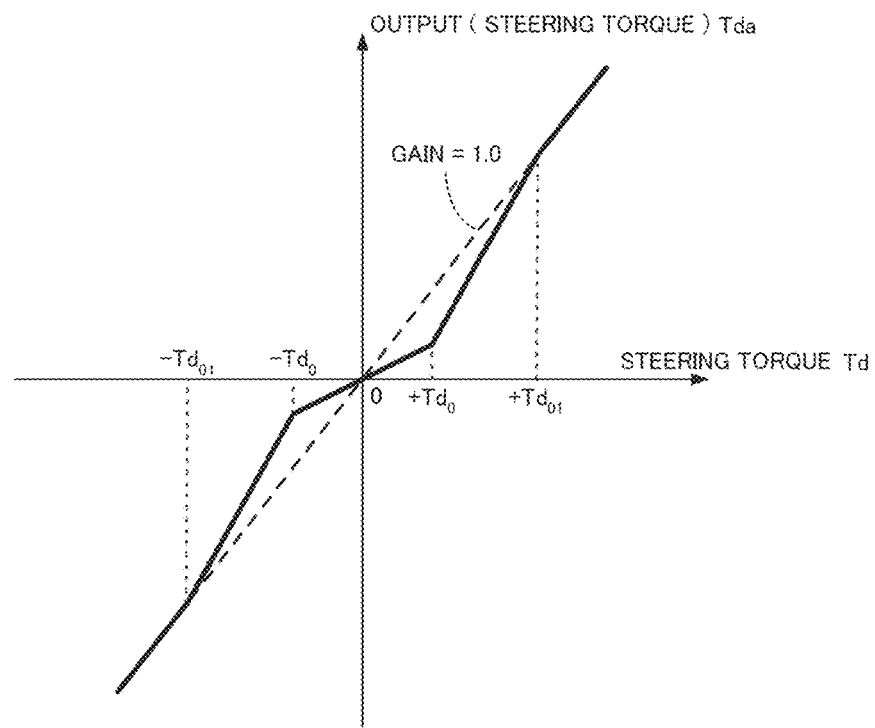
FIG. 17 is a characteristic diagram showing a characteristic example of the gain adjusting section.

FIG. 16 is corresponding to FIG. 3 and FIG. 11. In the second embodiment, the torque value AD1 from the adding section 102 is not used, and the gain adjusting section 112A that the input of the steering torque Td is changeable is provided. That is, the gain adjusting section 112A that inputs the steering torque Td and outputs the steering torque Tda which has a characteristic shown in FIG. 17 is provided in a preceding stage of the adding section 102. The steering torque Tda whose gain is adjusted is inputted into the adding section 102. The steering torque $Td_0$ of FIG. 17 is set in a range of 0 [Nm] to about 1.5 [Nm] that includes about 1

[Nm] of the steering torque in which the driver relatively feels the external disturbance from the road surface. Even in the second embodiment, the dead band section having the dead band characteristic shown in FIG. 13, instead of the gain adjusting section 112A, may be provided.

Figure 18:
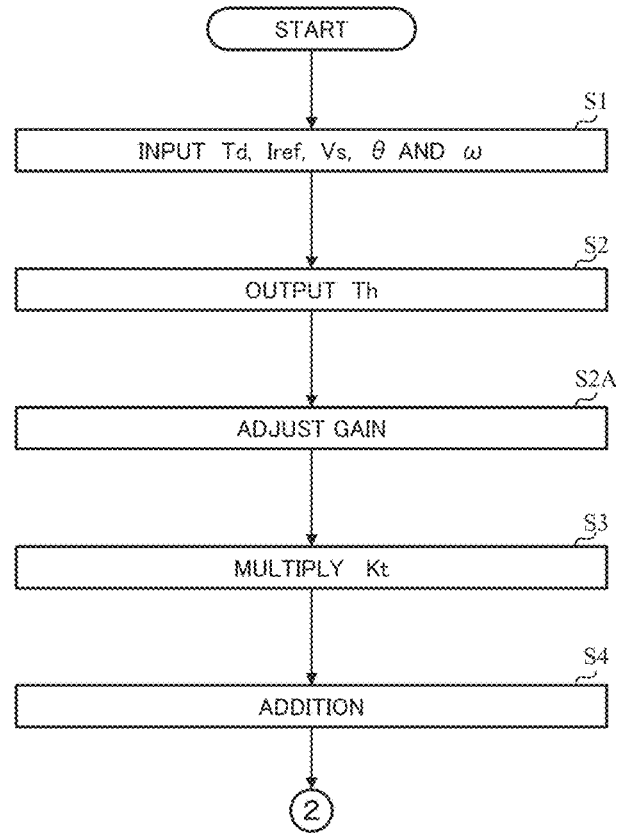
FIG. 18 is a part of a flowchart showing an operation example of the second embodiment according to the present invention.

An operation example of the second embodiment is shown in a flowchart of FIG. 18. At first, the steering torque Td, the current command value Iref, the vehicle speed Vs, the steering angle θ and the actual steering angle velocity ω are inputted (read) (Step S1), and the steering torque gain section 110 outputs the steering torque gain Th (Step S2). The steering torque Td is inputted into the gain adjusting section 112A, the gain of the steering torque Td is adjusted and the steering torque Tda whose gain is adjusted is inputted into the adding section 102 (Step S2A). The gain section 111 calculates the assist torque Ta by multiplying the current command value Iref with the multiplying value Kt that indicates "the motor torque constant" times "the gear ratio" times "the gear efficiency" (Step S3). The steering torque Tda is added to the assist torque Ta at the adding section 102 and the adding result is inputted into the steering system characteristic section 150 (Step S4). The following steps are the same as those of the first embodiment. That is, in the following steps, Step S10 of FIG. 14 to Step S38 of FIG. 15 are performed.

In a case that the dead band section is provided instead of the gain adjusting section 112A, the dead band-processed steering torque Tda is inputted into the adding section 102 (Step S2A).

Next, the handle-returning control section 100C of the third embodiment according to the present invention will be described with reference to FIG. 19. Even in the third embodiment, the LPF 151 may or may not be provided.

Figure 19:
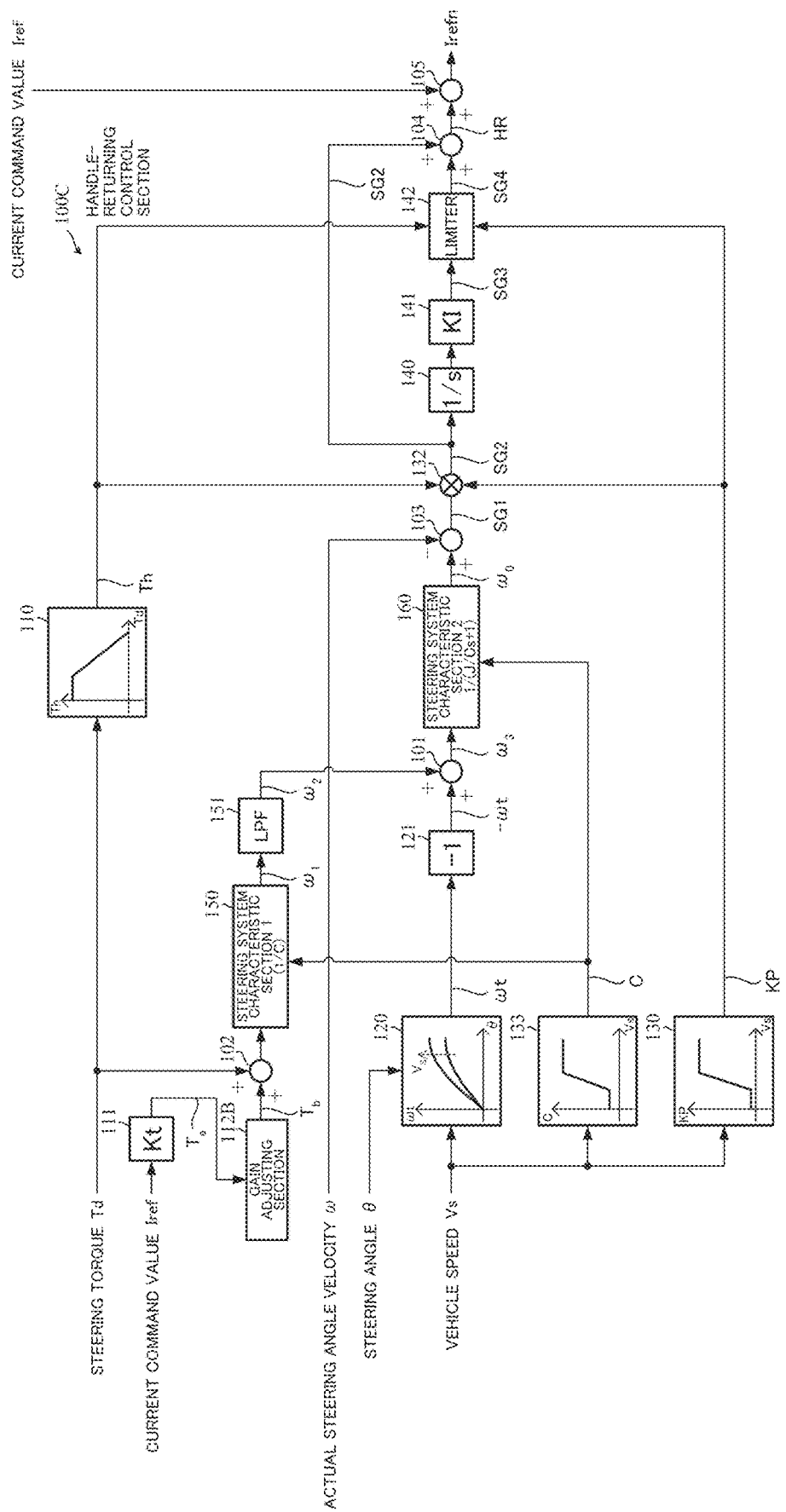
FIG. 19 is a block diagram showing a configuration example of the present invention (the third embodiment)
Figure 20:
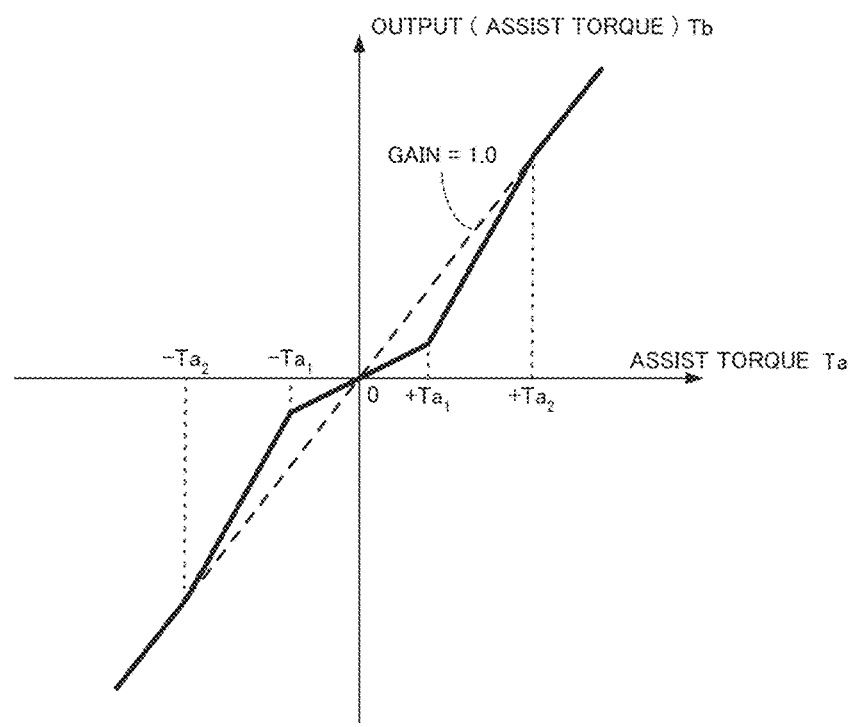
FIG. 20 is a characteristic diagram showing a characteristic example of the gain adjusting section.

FIG. 19 is corresponding to FIG. 16. In the third embodiment, the gain adjustment of the steering torque Td is not performed, and the gain adjusting section 112B that the assist torque Ta from the gain section 111 is changeable is provided. That is, the gain adjusting section 112B that inputs the assist torque Ta from the gain section 111 and outputs the assist torque Tb which has a characteristic as shown in FIG. 20 is provided in a preceding stage of the adding section 102. The assist torque Tb whose gain is adjusted is inputted into the adding section 102. The assist torque Ta1 of FIG. 20 is set in a range of 0 [Nm] to about 10 [Nm], considering that the assist torque in the low vehicle speed is set to about 10 [Nm] when the steering torque is about 1 [Nm] in which the driver relatively feels the external disturbance from the road surface. Even in the third embodiment, the dead band section having the dead band characteristic as shown in FIG. 13, instead of the gain adjusting section 112B, may be provided. As well as an explanation of the first embodiment, the vehicle speed is inputted into the gain adjusting section 112B or the dead band section and then the assist torque Ta₁ and the assist torque Tb corresponding to an assist torque Ta₁ may step-wisely or continuously be varied depending on the vehicle speed. The gain adjustment at the gain adjusting section 112B and the dead band-process at the dead band section are not performed for the assist torque $T_a$, the gain adjustment or the dead band-process may be performed for the current command value Iref and then the adjusted value may be multiplied with the multiplying value Kt.

Figure 21:
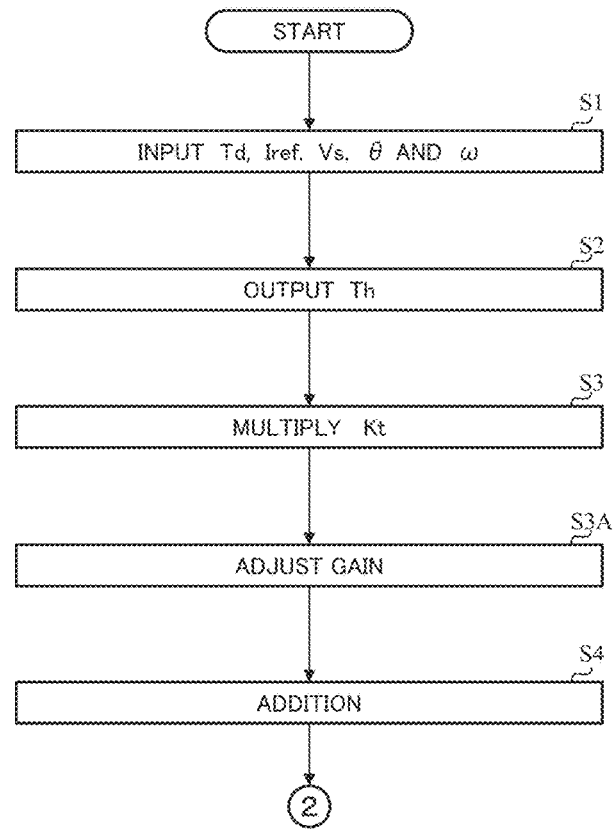
FIG. 21 is a part of a flowchart showing an operation example of the third embodiment according to the present invention.

An operation example of the third embodiment is shown in a flowchart of FIG. 21. At first, the steering torque Td, the current command value Iref, the vehicle speed Vs, the steering angle θ and the actual steering angle velocity ω are inputted (read) (Step S1), and the steering torque Td is inputted into the steering torque gain section 110 and the adding section 102. The steering torque gain section 110 outputs the steering torque gain Th (Step S2). The gain section 111 calculates the assist torque Ta by multiplying the current command value Iref with the multiplying value Kt that indicates "the motor torque constant" times "the gear ratio" times "the gear efficiency" (Step S3). The assist torque Ta is inputted into the gain adjusting section 112B, the gain of the assist torque Ta is adjusted and the assist torque Tb whose gain is adjusted is inputted into the adding section 102 (Step S3A). The assist torque Tb whose gain is adjusted is added to the steering torque Td at the adding section 102 and the addition result is inputted into the steering system characteristic section 150 (Step S4). The following steps are the same as those of the first embodiment. That is, in the following steps, Step S10 of FIG. 14 to Step S38 of FIG. 15 are performed.

As well, in a case that the dead band section is provided instead of the gain adjusting section 112B, the dead band-processed assist torque Tb is inputted into the adding section 102 (Step S3A).

The above gain adjustment at the gain adjusting section or the above dead band-process at the dead band section can be performed for both the steering torque Td and the assist torque Ta (the fourth embodiment).

As described above, in the first embodiment to the fourth embodiment, in the minute region that the steering torque or the assist torque, or both of them (or the addition torque value of the steering torque and the assist torque) are small, the gain adjusting section in which the gain is adjusted or the adjusting section having the dead band width is provided so that the output is small. Thereby, the uncomfortable feeling by the variation components that the intention of the driver is not represented can be reduced, the calculated target steering angle velocity is stabilized and the smooth returning steering feeling due to the handle-returning control can be realized. Particularly, in the substantially straight running, the lightly steering holding is performed by the driver and then the driver easily feels the noisy vibration due to the external disturbances. However, by being provided with the gain adjusting section, in which the gain is adjusted, and the dead band section so that the output is small in the above minute region, the driver can hardly feel this vibration.

Next, the fifth embodiment that achieves an optimal handle-returning performance by performing phase compensation such as a phase lead for the velocity deviation between the target steering angle velocity and the actual steering angle velocity and removing the delay and the disturbance components, will be described.

Figure 22:
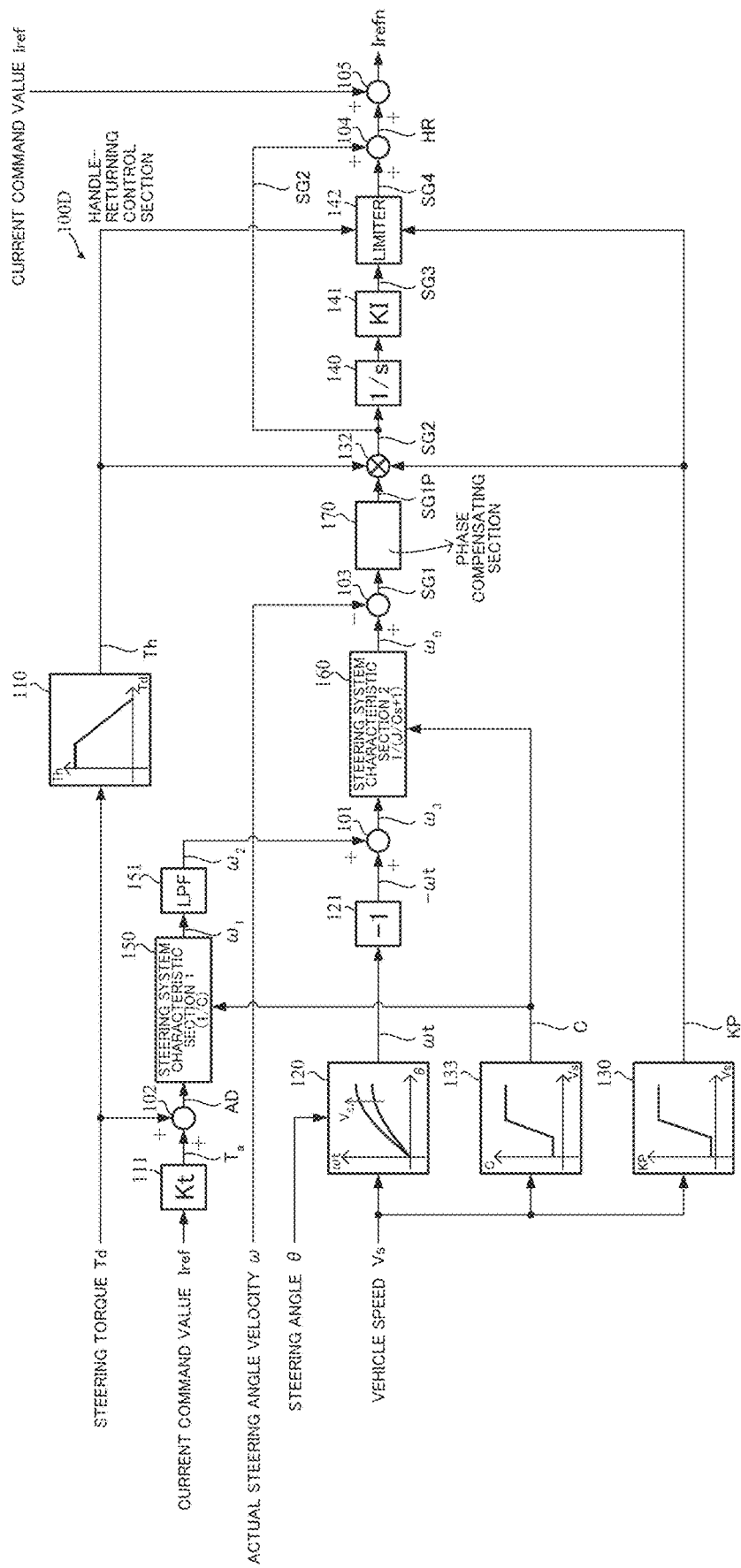
FIG. 22 is a block diagram showing a configuration example of the present invention (the fifth embodiment)

FIG. 22 shows a configuration example of the handle-returning control section 100D of the fifth embodiment, corresponding to FIG. 3. In the fifth embodiment, a phase compensating section 170 is interposed between the subtracting section 103 and the multiplying section 132. Since all the members other than the phase compensating section 170 are corresponding to those of FIG. 3, the same members are designated with the same numeral and the description is omitted.

Figure 23A:
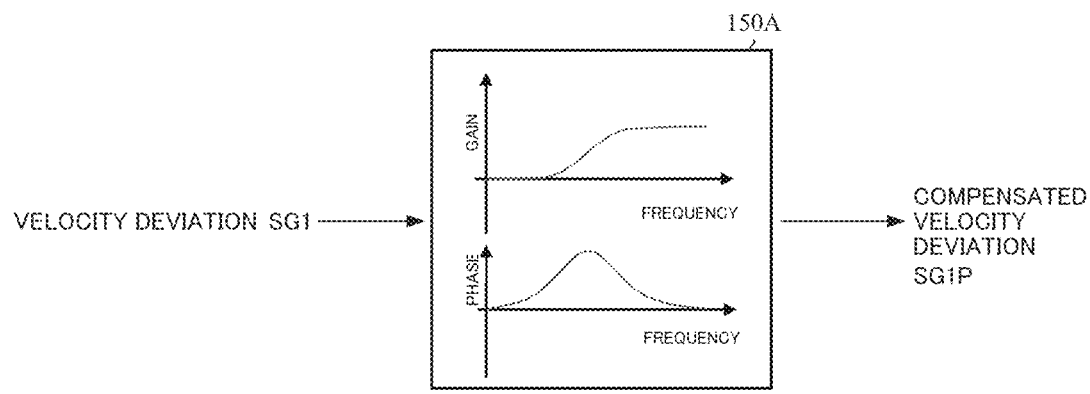
FIGS. 23A, 23B and 23C are characteristic diagrams showing characteristic examples of a phase adjusting section.
Figure 23B:
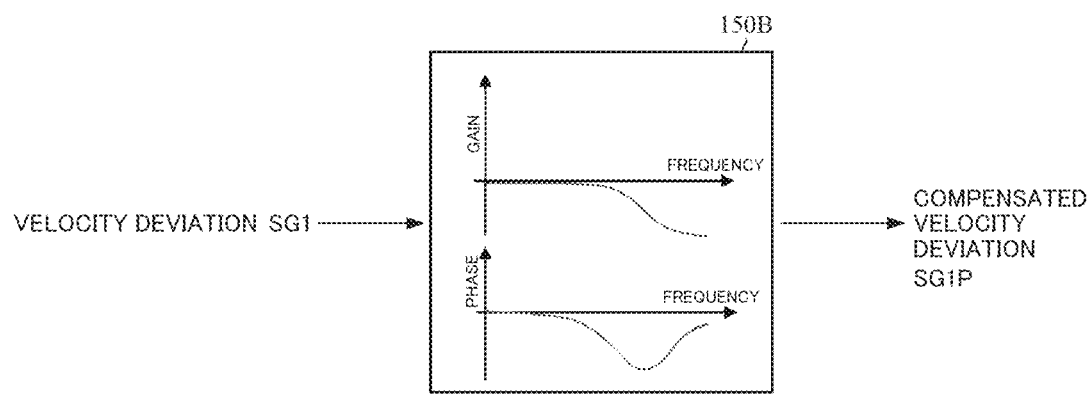
Figure 23C:
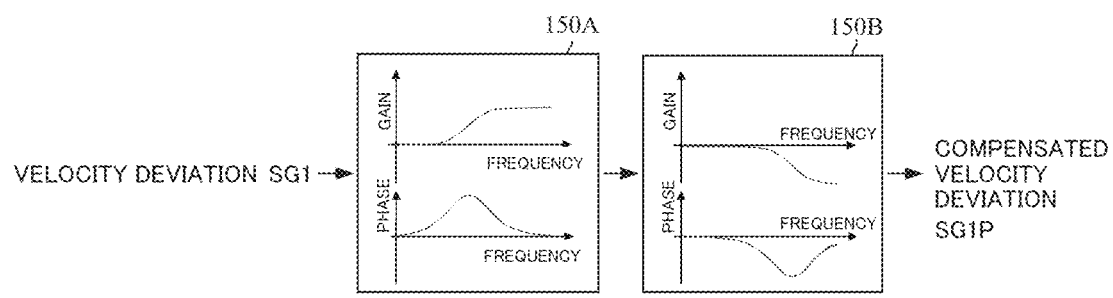

The phase compensating section 170 has characteristics as shown in FIGS. 23A, 23B and 23C, and FIG. 23A shows the characteristic in a case that the phase lead compensation is performed. The phase compensating section 170 performs the phase lead-process for the velocity deviation SG1 inputted from the subtracting section 103 and outputs a compensated velocity deviation SG1P. The compensated velocity deviation SG1P is inputted into the multiplying section 132. FIG. 23B shows the characteristic in a case that the phase delay compensation is performed. The phase compensating section 170 performs the phase delay-process for the velocity deviation SG1 inputted from the subtracting section 103 and outputs the compensated velocity deviation SG1P. The compensated velocity deviation SG1P is inputted into the multiplying section 132. FIG. 23C shows the characteristic in a case that a combination of the phase lead-process and the phase delay-process is performed. The phase compensating section 170 performs the phase lead-process and the phase delay-process for the velocity deviation SG1 inputted from the subtracting section 103 and outputs the compensated velocity deviation SG1P. The compensated velocity deviation SG1P is inputted into the multiplying section 132. The order of the phase lead-process and the phase delay-process is appropriately changeable. The phase delay-process may be a first order delay compensation.

In such a configuration, the operation example will be described with reference to the flowcharts of FIGS. 8 and 24.

Figure 8:
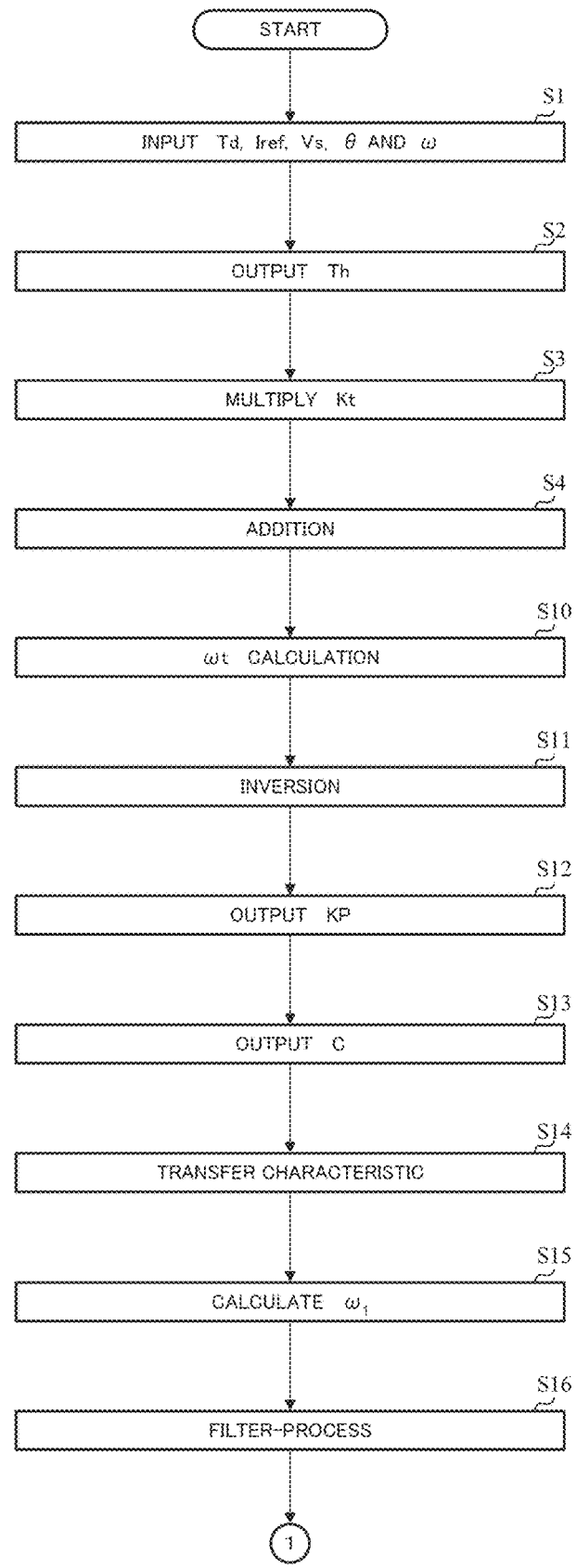
FIG. 8 is a part of a flowchart showing a basic operation example of the present invention.
Figure 9:
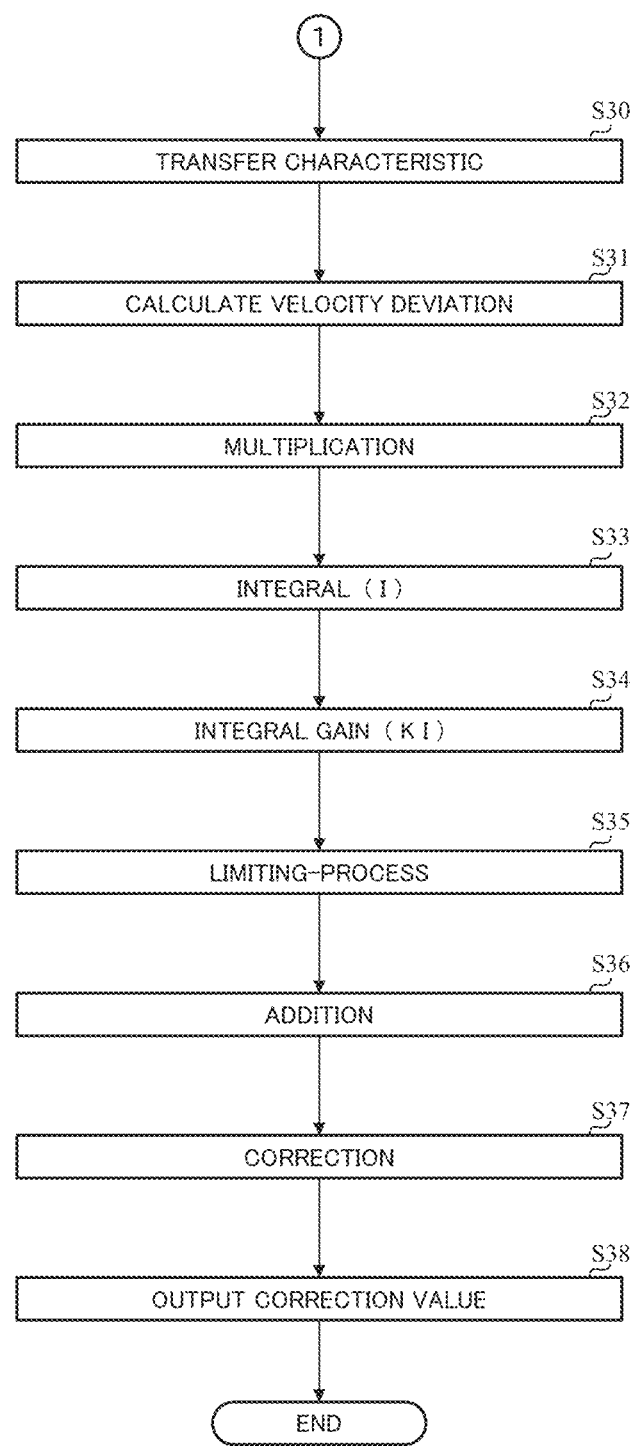
FIG. 9 is another part of a flowchart showing a basic operation example of the present invention.

At first, as shown in the flowchart of FIG. 8, the steering torque Td, the current command value Iref, the vehicle speed Vs, the steering angle θ and the actual steering angle velocity ω are inputted (read) (Step S1), and the steering torque gain section 110 outputs the steering torque gain Th (Step S2). The gain section 111 calculates the assist torque Ta by multiplying the current command value Iref with the multiplying value Kt that indicates "the motor torque constant" times "the gear ratio" times "the gear efficiency" (Step S3). The steering torque Td is added to the assist torque Ta at the adding section 102 and the sum torque value AD is inputted into the steering system characteristic section 150 (Step S4).

Further, the target returning velocity calculating section 120 calculates the target returning velocity ωt based on the inputted steering angle θ and vehicle speed Vs (Step S10), the inverting section 121 performs a sign inversion of the target returning velocity ωt (Step S11) and the inverted target returning velocity "−ωt" is inputted into the adding section 101. The vehicle speed gain section 130 outputs the vehicle speed gain KP in accordance with the vehicle speed Vs (Step S12). The viscosity coefficient outputting section 133 outputs the viscosity coefficient C in accordance with the vehicle speed Vs (Step S13). The viscosity coefficient C is inputted into the steering system characteristic section 150 and the steering system characteristic section 160. The steering system characteristic section 150 divides the torque value AD by the viscosity coefficient C (Step S14) and outputs the target velocity value $\omega_1$ (Step S15). The target velocity value $\omega_1$ is inputted into the LPF 151 and is filter-processed (Step S16).

Figure 24:
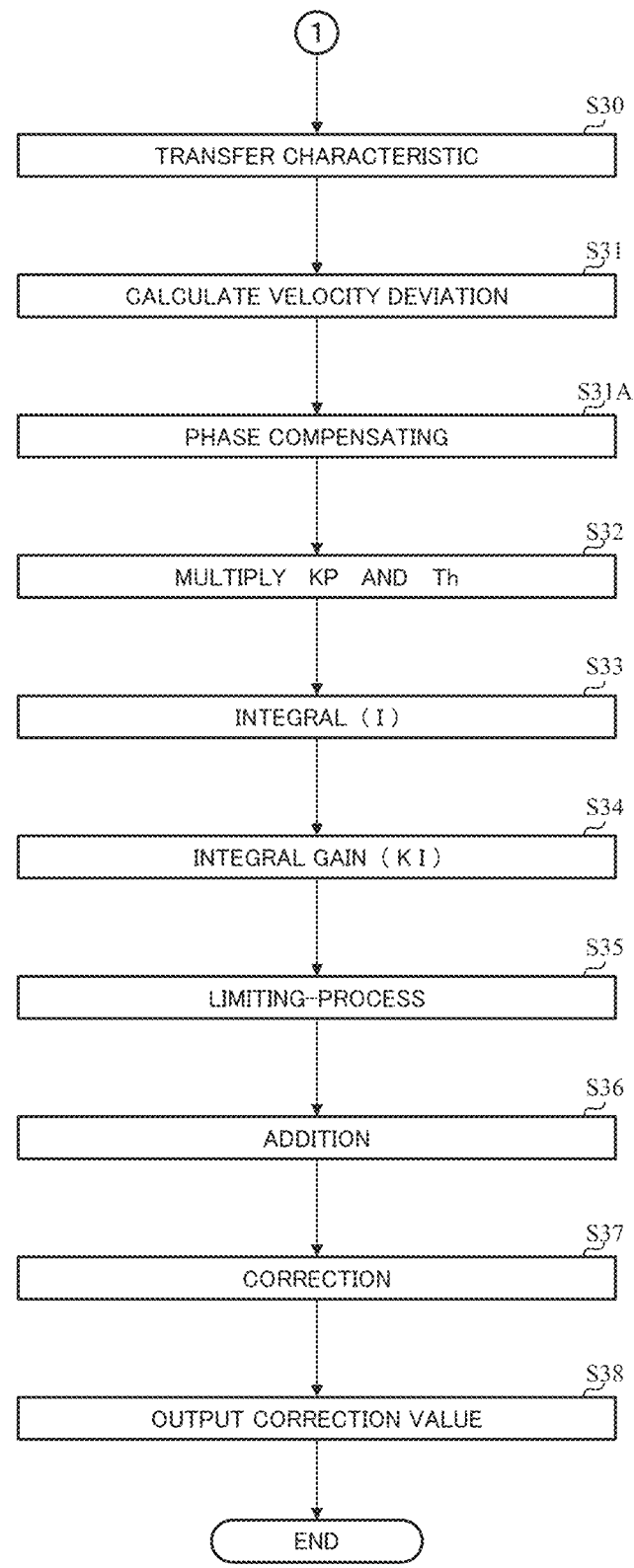
FIG. 24 is a part of a flowchart showing an operation example of the fifth embodiment according to the present invention.

In the following steps, as shown in the flowchart of FIG. 24, the target velocity value $\omega_2$ that is filter-processed at the LPF 151 is added to the target returning velocity "−ωt" at the adding section 101 and the target velocity value $\omega_3$ that is the above addition result is inputted into the steering system characteristic section 160. The target steering angle velocity $\omega_0$ is outputted from the steering system characteristic section 160 (Step S30). The velocity deviation SG1 between the target steering angle velocity $\omega_0$ and the actual steering angle velocity ω is calculated at the subtracting section 103 (Step S31).

The velocity deviation SG1 is inputted into the phase compensating section 170 (Step S31A). The above phase compensation for the velocity deviation SG1 is performed. The compensated velocity deviation SG1P from the phase compensating section 170 is inputted into the multiplying section 132, is multiplied with the steering torque gain Th and the vehicle speed gain KP (Step S32). The handle-returning control gain SG2 is calculated by the above multiplication. The handle-returning control gain SG2 is integral-processed at the integral control section 140 (Step S33), further the integral result is multiplied with an integral gain KI at the integral gain section 141 (Step S34) and then a handle-returning control gain SG3 is outputted. The handle-returning control gain SG3 is inputted into the limiter 142 and is limiting-processed at the limiter 142 by using the steering torque gain Th and the vehicle speed gain KP (Step S35).

The handle-returning control gain SG4 that is limiting-processed at the limiter 142 is inputted into the adding section 104 and is added to the handle-returning control gain SG2 (Step S36), and then the handle-returning control current HR is outputted. The current command value Iref is added to the handle-returning control current HR at the adding section 105 and is corrected (Step S37), and then the compensated current command value Irefn is outputted (Step S38).

As described above, in the fifth embodiment, the optimal handle-returning performance can be achieved by performing the phase compensation such as the phase lead for the velocity deviation between the target steering angle velocity and the actual steering angle velocity and removing the delay and the disturbance components.

Next, the sixth embodiment that achieves, in the high compatibility, both the handle-returning performance and the steering-forward steering feeling by changing or switching the viscosity coefficient C depending on the steering-forward state and the steering-backward state of the steering system, will be described.

Figure 25:
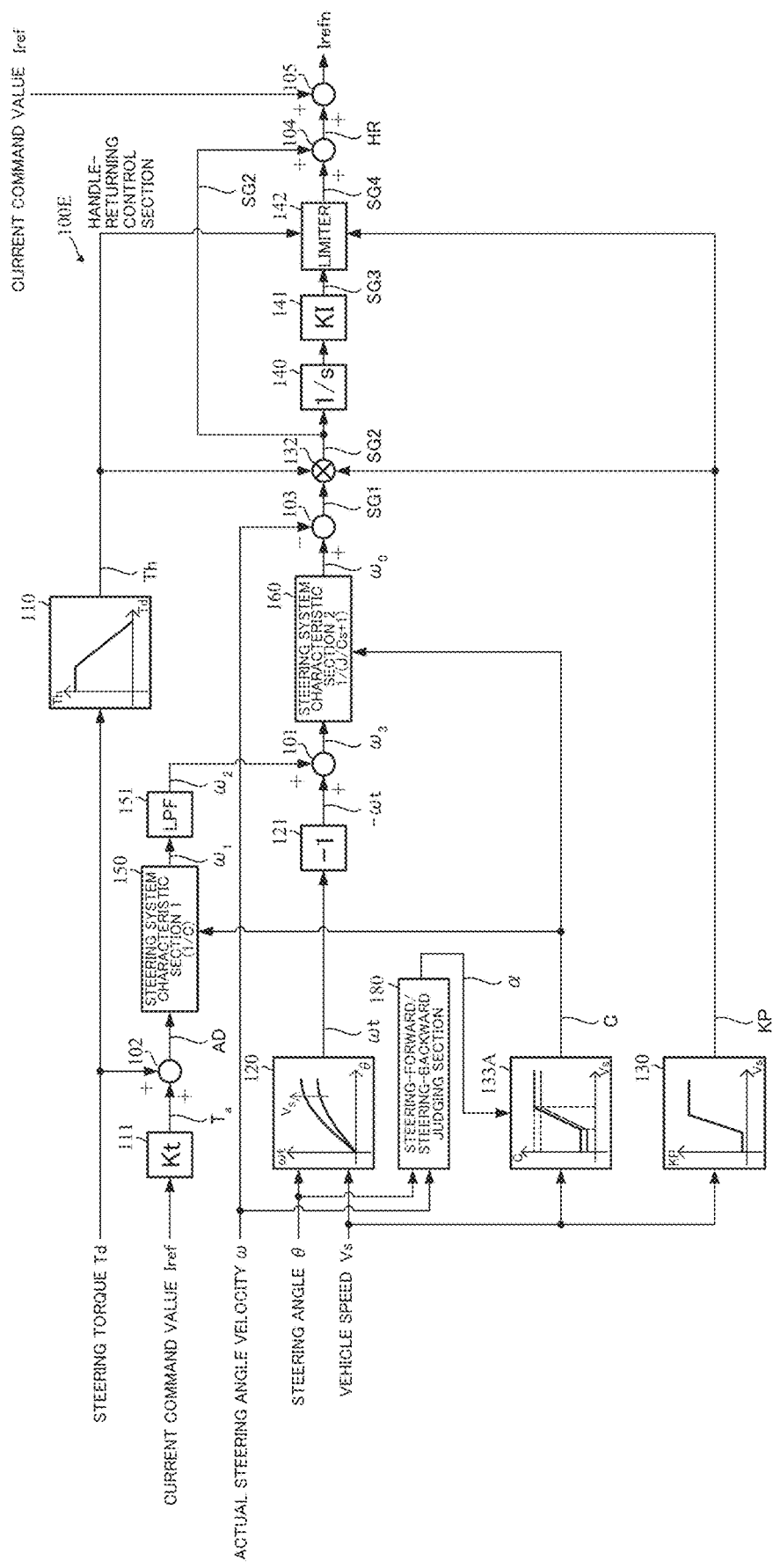
FIG. 25 is a block diagram showing a configuration example of the present invention (the sixth embodiment)

FIG. 25 shows a configuration example of the handle-returning control section 100E of the sixth embodiment, corresponding to FIG. 3. A steering-forward/steering-backward judging section 180 is provided, and the viscosity coefficient outputting section 133 is changed to the viscosity coefficient outputting section 133A. Other elements are the same as those of FIG. 3, and the LPF 151 may or may not be provided.

Figure 26:
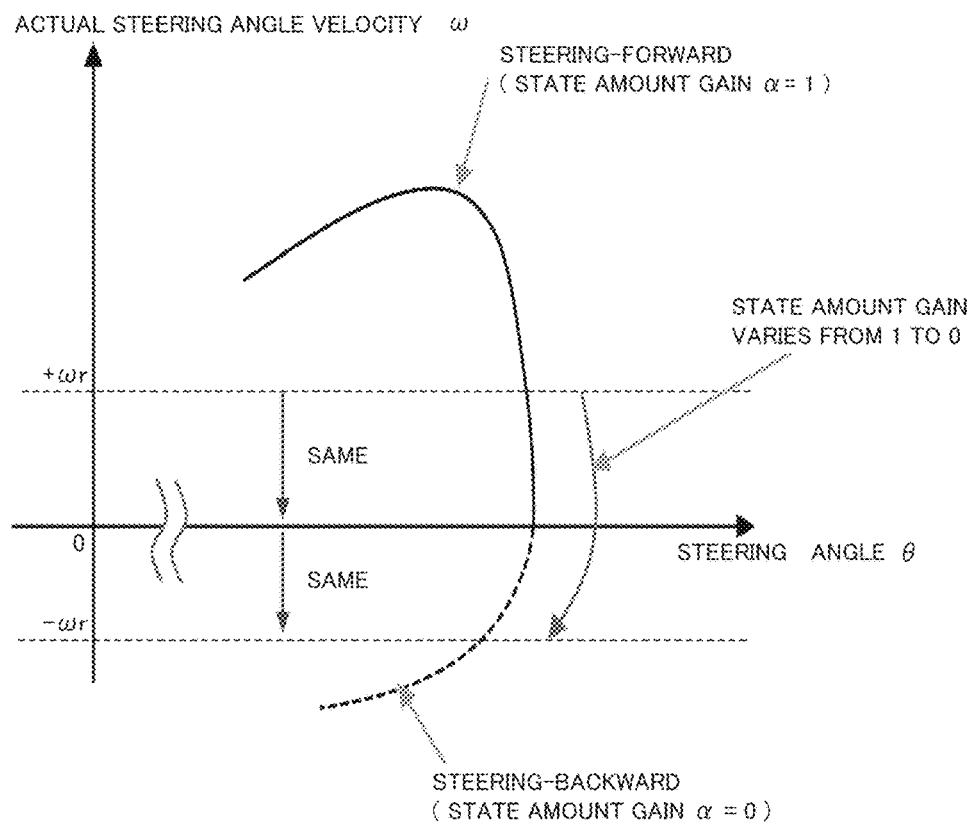
FIG. 26 is a characteristic diagram explaining a state amount in steering-forward/steering-backward.
Figure 27:
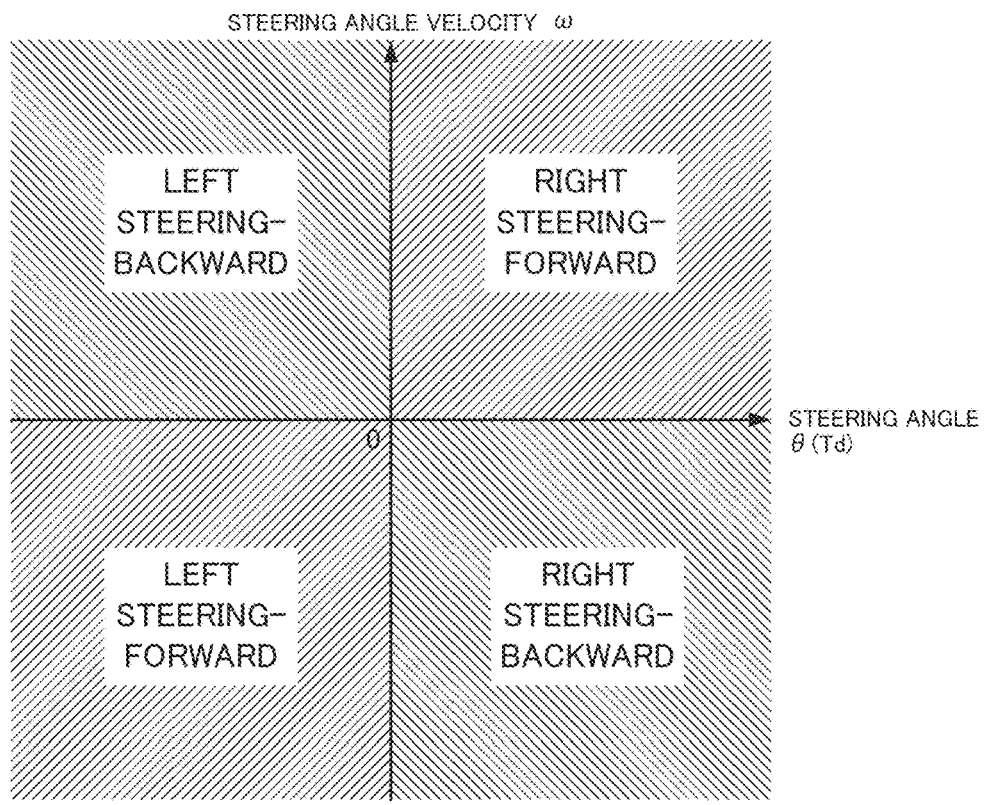
FIG. 27 is a graph showing a judging example of steering-forward/steering-backward.

The steering-forward/steering-backward judging section 180 judges steering-forward/steering-backward based on the steering angle θ and the actual steering angle velocity ω, sets a predetermined range ("−$\omega_r$" to "+$\omega_r$") of the actual steering angle velocity ω as shown in FIG. 26, and outputs a state amount gain α as information depending on the steering-forward and the steering-backward state. The state amount gain α is inputted into the viscosity coefficient outputting section 133A. The state amount gain α as the information depending on the steering-forward state and the steering-backward state may output so that "1" is outputted in a case of the steering-forward and "0" is outputted in a case of the steering-backward. Alternatively, as described below, the state amount gain α may continuously be varied between "1" and "0". In the present embodiment, as shown in FIG. 27, the steering-forward/steering-backward judging section 180 judges the steering-forward and the steering-backward state based on the steering angle θ and the direction (positive or negative) relationship of the steering angle velocity ω, and outputs the state amount gain α depending on the steering-forward and the steering-backward state. The judging of the steering-forward/steering-backward may be used by the steering torque Td and the direction (positive or negative) relationship of the steering angle velocity ω. Other known judging methods can be used in the judging of the steering-forward/steering-backward.

Figure 28A:
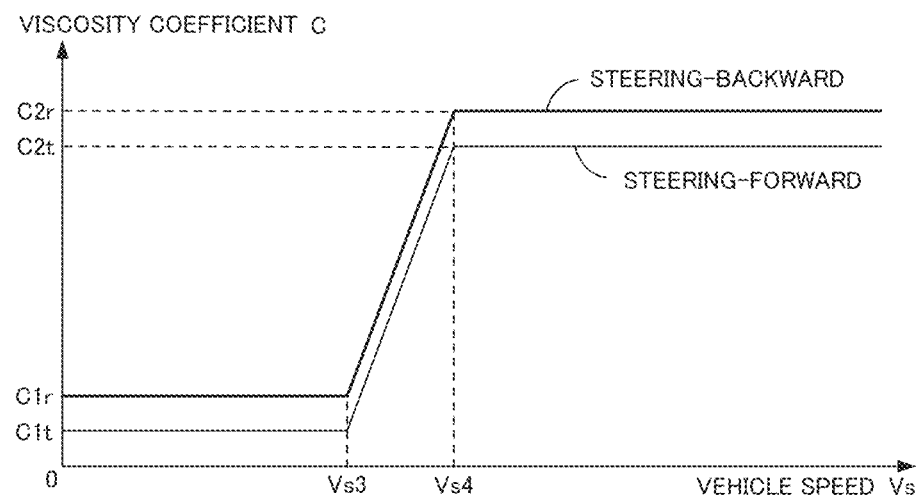
FIGS. 28A and 28B are characteristic diagrams showing changing examples of outputs of a viscosity coefficient outputting section.
Figure 28B:
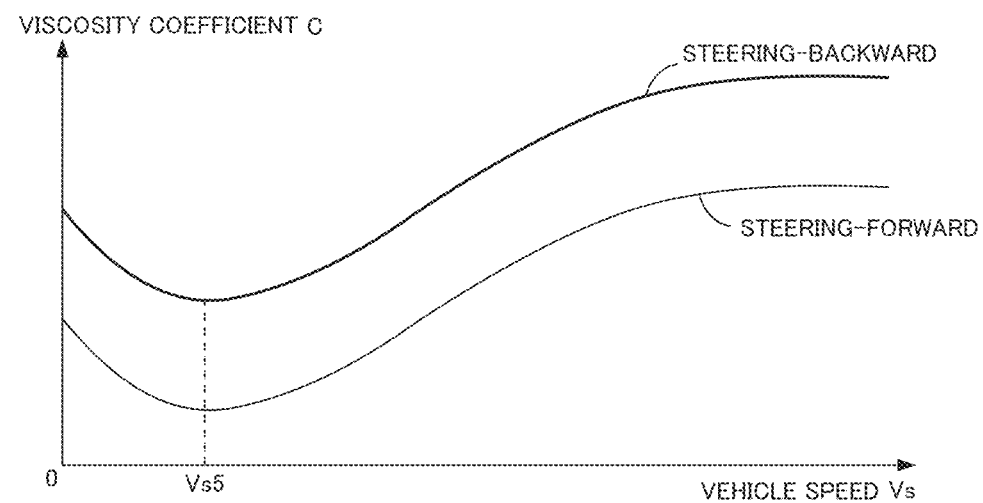

The viscosity coefficient outputting section 133A outputs the viscosity coefficient C by using the characteristics as shown in FIG. 28A or FIG. 28B, depending on the vehicle speed Vs and the state amount gain α as the steering-forward/steering-backward information. The viscosity coefficient C is inputted into the steering system characteristic section 150 and the steering system characteristic section 160 from the viscosity coefficient outputting section 133A. That is, the viscosity coefficient outputting section 133A has the small viscosity coefficient that is outputted in the steering-forward maneuver and the large viscosity coefficient that is outputted in the steering-backward maneuver, changes or switches the viscosity coefficient C depending on the state amount gain α as the steering-forward/steering-backward information, and outputs the viscosity coefficient C.

In FIGS. 28A and 28B, thin lines denote the viscosity coefficients in the steering-forward maneuver and thick lines denote the viscosity coefficients in the steering-backward maneuver. In the characteristic examples of FIG. 28A, the viscosity coefficients in steering-forward maneuver and steering-backward maneuver have constant viscosity coefficients C1$t$ and C1$r$ when the vehicle speed is equal to or lower than a vehicle speed Vs3, respectively. The viscosity coefficients in steering-forward maneuver and the steering-backward maneuver linearly increase when the vehicle speed is within a range of the vehicle speed Vs3 to the vehicle speed Vs4. The viscosity coefficients in steering-forward maneuver and steering-backward maneuver have constant viscosity coefficients C2$t$ and C2$r$ when the vehicle speed is equal to or higher than the vehicle speed Vs4, respectively. The vehicle speed Vs3 and the vehicle speed Vs4 in steering-forward maneuver and steering-backward maneuver are the same values. Both the above vehicle speeds in the steering-forward may be different from the vehicle speeds in the steering-backward. In the characteristic examples of FIG. 28B, the viscosity coefficients in the steering-forward state and the steering-backward state nonlinearly decrease (gradually decrease) when the vehicle speed is equal to or lower than a vehicle speed Vs5, and nonlinearly increase (gradually increase) when the vehicle speed is equal to or higher than the vehicle speed Vs5. In FIG. 28B, the vehicle speed Vs5 in steering-forward and steering-backward is the same value. The above vehicle speed in the steering-forward may different from the vehicle speed in the steering-backward.

The vehicle speed and the state amount gain α are inputted into the viscosity coefficient outputting section 133A of the present invention. A final viscosity coefficient C is calculated by using the following expression 11, and is inputted into the steering system characteristic sections 150 and 160.

final viscosity coefficient C=(viscosity coefficient in the steering-forward state)×α+(viscosity coefficient in the steering-backward state)×(1−α)  [Expression 11]

where, α satisfies "0≤α≤1".

As described above, when the viscosity coefficient C is smaller, the steering angle velocity $\omega_1$ generated by the steering torque Td and the assist torque Ta is larger and the ratio of the steering angle velocity $\omega_1$ to the target steering angle velocity can relatively be larger. Since the operation of the driver is easily reflected on the target steering angle velocity, the control output is easily varied due to the steering by the driver, and the driver can steer the handle without occurring unnatural resistant feeling even when the handle-returning control is implemented. On the other hand, when the viscosity coefficient C is larger, the ratio of the returning target velocity $\omega_r$ to the target steering angle velocity is relatively larger. Thereby, the influence due to the steering by the driver becomes small and the stable handle-returning can be realized. For example, when the viscosity coefficient C is smaller in the steering-forward and the viscosity coefficient C is larger in the steering-backward, the driver can steer the handle without resistance feeling in the steering-forward. In the steering-backward, even when the driver lightly grips the handle, the stable handle-returning can be realized. The viscosity coefficient is determined by the vehicle test, keeping the balance of the above steering feeling and the returning performance.

Figure 29:
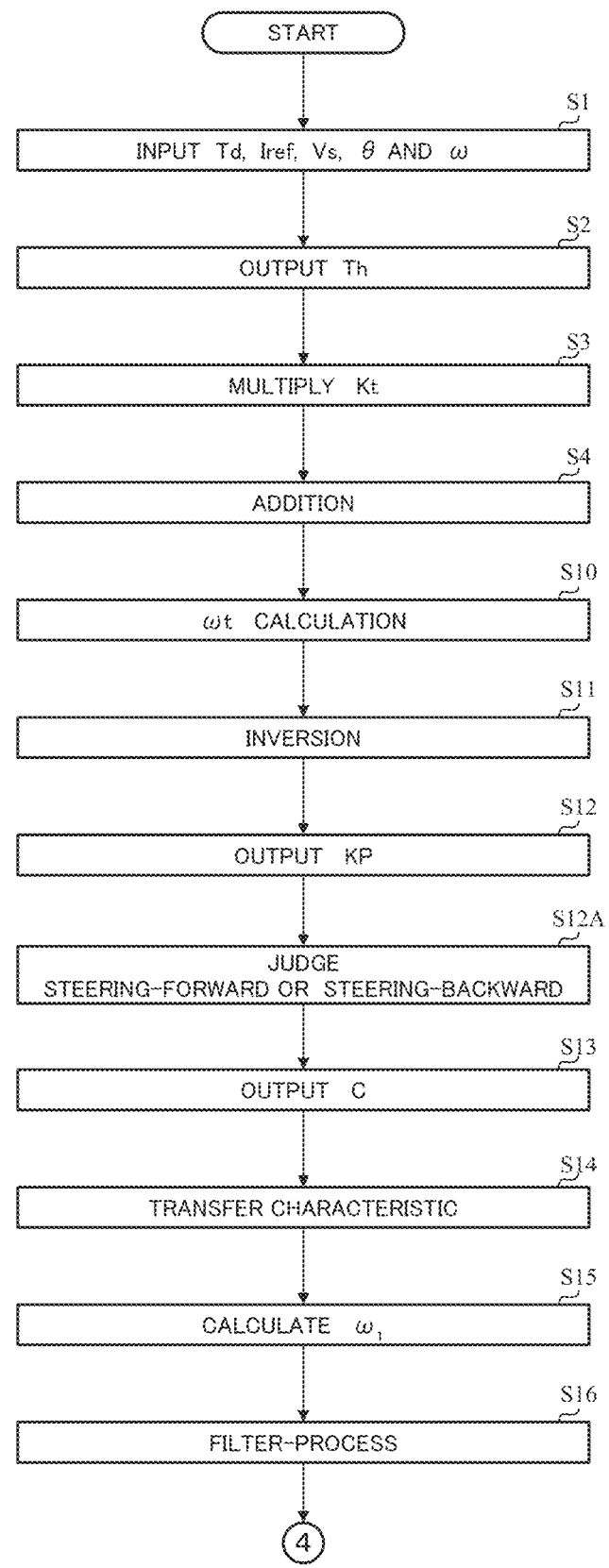
FIG. 29 is a part of a flowchart showing an operation example of the sixth embodiment according to the present invention.
Figure 30:
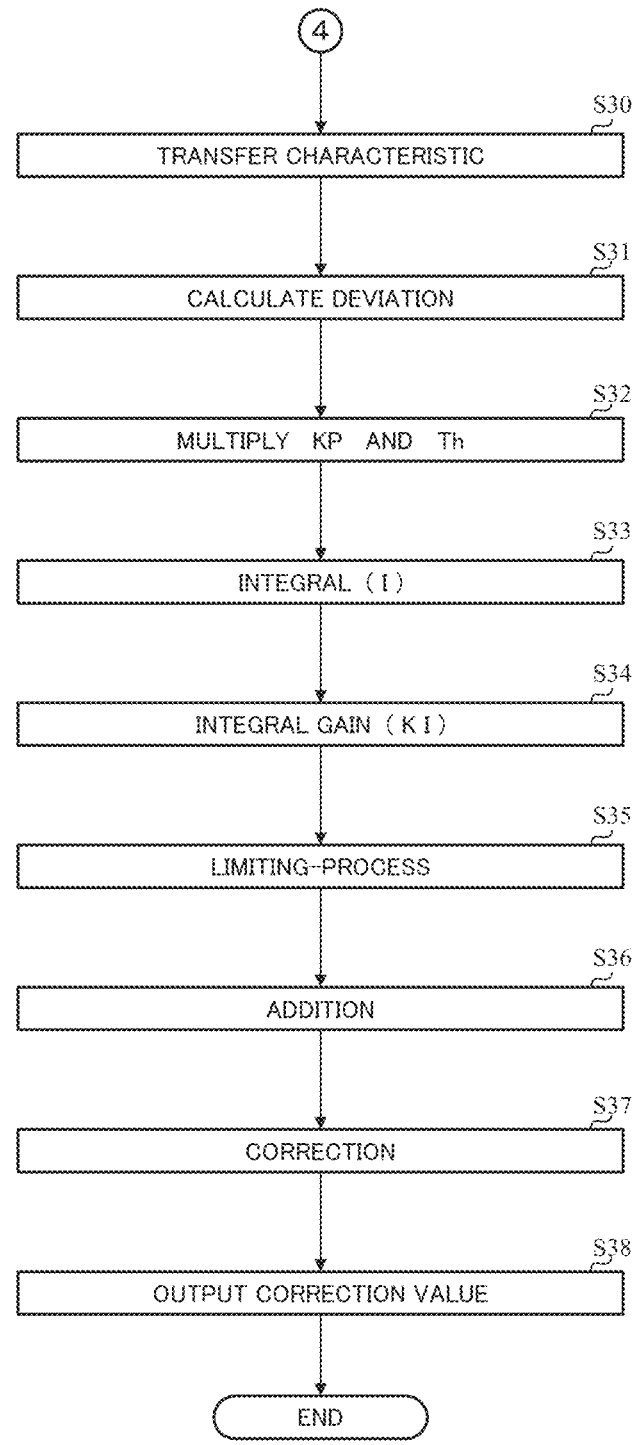
FIG. 30 is another part of a flowchart showing an operation example of the sixth embodiment according to the present invention.

In such a configuration, the operation example will be described with reference to the flowcharts of FIGS. 29 and 30.

At first, the steering torque Td, the current command value Iref, the vehicle speed Vs, the steering angle θ and the actual steering angle velocity ω are inputted (read) (Step S1), and the steering torque gain section 110 outputs the steering torque gain Th (Step S2). The gain section 111 calculates the assist torque Ta by multiplying the current command value Iref with the multiplying value Kt that indicates "the motor torque constant" times "the gear ratio" times "the gear efficiency" (Step S3). The steering torque Td is added to the assist torque Ta at the adding section 102 and the sum torque value AD is inputted into the steering system characteristic section 150 (Step S4).

The target returning velocity calculating section 120 calculates the target returning velocity ωt based on the inputted steering angle θ and vehicle speed Vs (Step S10), the inverting section 121 performs a sign inversion of the target returning velocity ωt (Step S11) and the inverted target returning velocity "−ωt" is inputted into the adding section 101. The vehicle speed gain section 130 outputs the vehicle speed gain KP in accordance with the vehicle speed Vs (Step S12). The steering-forward/steering-backward judging section 180 judges the steering-forward state and the steering-backward state based on the steering angle θ and the actual steering angle velocity ω, and the state amount gain α as the steering-forward/steering-backward information is inputted into the viscosity coefficient outputting section 133A (Step S12A). The viscosity coefficient outputting section 133A outputs the viscosity coefficient C in accordance with the vehicle speed Vs and the state amount gain α as the steering-forward/steering-backward information (Step S13). The viscosity coefficient C is inputted into the steering system characteristic section 150 and the steering system characteristic section 160. The steering system characteristic section 150 divides the torque value AD by the viscosity coefficient C (Step S14) and outputs the target velocity value $\omega_1$ (Step S15). The target velocity value $\omega_1$ is inputted into the LPF 151 and is filter-processed (Step S16).

The target velocity value $\omega_2$ that is filter-processed at the LPF 151 is added to the target returning velocity "−ωt" at the adding section 101 and the target velocity value $\omega_3$ that is the above addition result is inputted into the steering system characteristic section 160. The target steering angle velocity $\omega_0$ is outputted from the steering system characteristic section 160 (Step S30). The velocity deviation SG1 between the target steering angle velocity $\omega_0$ and the actual steering angle velocity ω is calculated at the subtracting section 103 (Step S31).

The velocity deviation SG1 is inputted into the multiplying section 132, is multiplied with the steering torque gain Th and the vehicle speed gain KP (Step S32). The handle-returning control gain SG2 is calculated by the above multiplication. The handle-returning control gain SG2 is integral-processed at the integral control section 140 (Step S33), further the integral result is multiplied with an integral gain KI at the integral gain section 141 (Step S34) and then the handle-returning control gain SG3 is outputted. The handle-returning control gain SG3 is inputted into the limiter 142 and is limiting-processed at the limiter 142 by using the steering torque gain Th and the vehicle speed gain KP (Step S35).

The handle-returning control gain SG4 that is limiting-processed at the limiter 142 is inputted into the adding section 104 and is added to the handle-returning control gain SG2 (Step S36), and then the handle-returning control current HR is outputted. The current command value Iref is added to the handle-returning control current HR at the adding section 105 and is corrected (Step S37), and then the compensated current command value Irefn is outputted (Step S38).

As described above, in the sixth embodiment, since the viscosity coefficient C, which is used for calculating the target steering angle velocity $\omega_0$, is changed or is switched depending on the steering-forward state and the steering-backward state of the steering system, both the handle-returning performance and the steering-forward steering feeling can be achieved in the high compatibility.

It is also possible to calculate the steering angle velocity $\omega$ by multiplying a motor angular velocity with the gear ratio, and the transfer characteristic of the virtual steering system model may be changeable depending on the vehicle speed, the steering angle, and the steering-forward state, the steering-backward state or a steering holding state. The orders of data inputting, calculations and processes in FIGS. 8 and 9 are appropriately changeable.

EXPLANATION OF REFERENCE NUMERALS 1 handle
2 column shaft (steering shaft, handle shaft)
10 torque sensor
12 vehicle speed sensor
14 steering angle sensor
20 motor
30 control unit (ECU)
31 current command value calculating section
33 current limiting section
34 compensation signal generating section
100, 100A, 100B, 100C, 100D, 100E handle-returning control section
110 steering torque gain section
111 gain section
112, 112A, 112B gain adjusting section
120 target returning velocity calculating section
121 inverting section
130 vehicle speed gain section
133, 133A viscosity coefficient outputting section
140 integral section
141 integral gain section
142 limiter
150 steering system characteristic section (1/C)
151 low pass filter (LPF)
160 steering system characteristic section (1/(J/Cs+1))
170 phase adjusting section
180 steering-forward/steering-backward judging section

The invention claimed is:

1. An electric power steering apparatus that calculates a current command value based on at least a steering torque, drives a motor based on said current command value and assist-controls a steering system by a driving-control of said motor, comprising:
a handle-returning control section to calculate a handle-returning control current according to a steering angle, said steering torque, said current command value, a vehicle speed and an actual steering angle velocity, and to drive said motor with a compensated current command value obtained by compensating said current command value by said handle-returning control current,
wherein said handle-returning control section has a configuration to calculate a target steering angle velocity in considering a viscosity coefficient of said steering system and to calculate said handle-returning control current based on a velocity deviation between said target steering angle velocity and said actual steering angle velocity, and
wherein said viscosity coefficient is changed or switched depending on a steering-forward state and a steering-backward state of said steering system.

2. The electric power steering apparatus according to claim 1, wherein said viscosity coefficient in said steering-forward state is smaller than said viscosity coefficient in said steering-backward state.

3. The electric power steering apparatus according to claim 1, wherein a characteristic of said viscosity coefficient is varied depending on said vehicle speed.

4. The electric power steering apparatus according to claim 1, wherein a predetermined region is set to said actual steering angle velocity, a state amount gain $\alpha$ is assigned to said predetermined region, and said viscosity coefficient is calculated based on "(viscosity coefficient in said steering-forward state×$\alpha$)+(viscosity coefficient in said steering-backward state×$(1-\alpha)$)".

5. An electric power steering apparatus that calculates a current command value based on at least a steering torque, drives a motor based on said current command value and assist-controls a steering system by a driving-control of said motor, comprising:
a handle-returning control section to calculate a handle-returning control current according to a steering angle, said steering torque, said current command value, a vehicle speed and an actual steering angle velocity, and to drive said motor with a compensated current command value obtained by compensating said current command value by said handle-returning control current,
wherein said handle-returning control section comprises:
a target returning velocity calculating section to calculate a target returning velocity based on said steering angle and said vehicle speed;
a steering torque gain section to calculate a steering torque gain based on said steering torque;
a steering-forward/steering-backward judging section to output a steering-forward/steering-backward information by judging a steering-forward state and a steering-backward state of said steering system;
a viscosity coefficient outputting section to calculate a viscosity coefficient of said steering system based on said vehicle speed and said steering-forward/steering-backward information;
a vehicle speed gain section to obtain a vehicle speed gain based on said vehicle speed;
a first steering system characteristic section to calculate a target velocity value from an addition value, which is added said steering torque to an assist torque calculated from said current command value, and said viscosity coefficient;
a second steering system characteristic section to input an addition velocity value obtained by adding said target returning velocity and said target velocity value, and to obtain a target steering angle velocity from said viscosity coefficient and an inertia moment of said steering system;
a handle-returning control gain calculating section to calculate a handle-returning control gain by multiplying a velocity deviation between said target steering angle velocity and said actual steering angle velocity with said vehicle speed gain and said steering torque gain; and
a handle-returning control current calculating section to perform at least one control calculation of a proportional control calculation (P), an integral control calculation (I) and a differential control calculation (D) for said handle-returning control gain, and to obtain said handle-returning control current by output-limiting with said vehicle speed gain and said steering torque gain.

6. The electric power steering apparatus according to claim 5, wherein said viscosity coefficient outputting section sets said viscosity coefficient in said steering-forward state to be smaller than said viscosity coefficient in said steering-backward state, based on said steering-forward/steering-backward information.

7. The electric power steering apparatus according to claim 5, wherein a characteristic of said viscosity coefficient is varied depending on said vehicle speed.

8. The electric power steering apparatus according to claim 5,
wherein said steering-forward/steering-backward judging section sets a predetermined region to said actual steering angle velocity and assigns a state amount gain a to said predetermined region, and
said viscosity coefficient outputting section calculates said viscosity coefficient based on "(viscosity coefficient in said steering-forward state×α)+(viscosity coefficient in said steering-backward state×(1−α))".

9. The electric power steering apparatus according to claim 5, wherein said steering-forward/steering-backward judging section judges said steering-forward state and said steering-backward state from a first sign relationship between said steering angle and said actual steering angle velocity, or a second sign relationship between said steering torque and said actual steering angle velocity.

10. An electric power steering apparatus that calculates a current command value based on at least a steering torque, drives a motor based on said current command value and assist-controls a steering system by a driving-control of said motor, comprising:
a handle-returning control section to calculate a handle-returning control current according to a steering angle, said steering torque, said current command value, a vehicle speed and an actual steering angle velocity, and to drive said motor with a compensated current command value obtained by compensating said current command value by said handle-returning control current,
wherein said handle-returning control section has a configuration to calculate said handle-returning control current based on a velocity deviation between a target steering angle velocity and said actual steering angle velocity,
calculate a target returning velocity based on said steering angle and said vehicle speed, calculate said target steering angle velocity by adjusting said target returning velocity based on an addition value which is added said steering torque to an assist torque calculated from said current command value, and adjust a gain or perform a dead band process as a correction for at least one of said steering torque, said current command value and said assist torque, or for an addition torque value of said steering torque and said assist torque.

11. The electric power steering apparatus according to claim 10, wherein said correction is performed at a gain adjusting section.

12. The electric power steering apparatus according to claim 11, wherein said gain adjusting section has a characteristic that an output value is smaller than a value of a characteristic in which output value is equal to an input value, a gain is equal to "1", in a predetermined region containing zero of said steering torque, or said assist torque, or said addition torque value.

13. The electric power steering apparatus according to claim 11, wherein said gain adjusting section inputs said vehicle speed and makes a characteristic in a predetermined region containing zero changeable, depending on said vehicle speed.

14. The electric power steering apparatus according to claim 10, wherein said correction is performed at a dead band section.

15. The electric power steering apparatus according to claim 14, wherein said dead band section has a dead band width in a predetermined region containing zero of said steering torque, or said assist torque, or said addition torque value.

16. The electric power steering apparatus according to claim 14, wherein said dead band section inputs said vehicle speed and makes a dead band characteristic in a predetermined region containing zero changeable, depending on said vehicle speed.

17. An electric power steering apparatus that calculates a current command value based on at least a steering torque, drives a motor based on said current command value and assist-controls a steering system by a driving-control of said motor, comprising:
a handle-returning control section to calculate a handle-returning control current according to a steering angle, said steering torque, said current command value, a vehicle speed and an actual steering angle velocity, and to drive said motor with a compensated current command value obtained by compensating said current command value by said handle-returning control current,
wherein said handle-returning control section comprises:
a target returning velocity calculating section to calculate a target returning velocity based on said steering angle and said vehicle speed;
a steering torque gain section to obtain a steering torque gain based on said steering torque;
a viscosity coefficient outputting section to obtain a viscosity coefficient C of said steering system based on said vehicle speed;
a vehicle speed gain section to obtain a vehicle speed gain based on said vehicle speed;
a first steering system characteristic section to calculate a target velocity value $\omega1$ from an addition value, which is added said steering torque to an assist torque calculated from said current command value, and said viscosity coefficient C;
an adjusting section that has an adjustment of a gain or a dead band width for at least one of said steering torque, said current command value and said assist torque, or for an addition value of said steering torque and said assist torque;
a filter to filter-process said target velocity value $\omega1$;

a second steering system characteristic section to input a target velocity value ω3 obtained from said target returning velocity and a target velocity value ω2 from said filter, and to obtain a target steering angle velocity from said viscosity coefficient C and an inertia moment J of said steering system;

a handle-returning control gain calculating section to calculate a handle-returning control gain by multiplying a velocity deviation between said target steering angle velocity and said actual steering angle velocity with said vehicle speed gain and said steering torque gain; and a handle-returning control current calculating section to perform at least one control calculation of a proportional control calculation (P), an integral control calculation (I) and a differential control calculation (D) for said handle-returning control gain, and to obtain said handle-returning control current by output-limiting with said vehicle speed gain and said steering torque gain.

18. The electric power steering apparatus according to claim 17, wherein a function of said adjusting section is performed in a predetermined region containing zero of said steering torque.

19. The electric power steering apparatus according to claim 17, wherein a function of said adjusting section is performed in a predetermined region containing zero of said current command value or said assist torque.

20. The electric power steering apparatus according to claim 17, wherein a function of said adjusting section is performed in respective predetermined region containing zero of said assist torque and said steering torque.

21. The electric power steering apparatus according to claim 17, wherein a function of said adjusting section is performed to an addition torque value obtained by adding said steering torque and said assist torque.

22. The electric power steering apparatus according to claim 17, wherein said adjusting section having a gain adjustment or a dead band width inputs said vehicle speed and makes a characteristic changeable depending on said vehicle speed.

23. An electric power steering apparatus that calculates a current command value based on at least a steering torque, drives a motor based on said current command value and assist-controls a steering system by a driving-control of said motor, comprising:

a handle-returning control section to calculate a handle-returning control current according to a steering angle, said steering torque, said current command value, a vehicle speed and an actual steering angle velocity, and to drive said motor with a compensated current command value obtained by compensating said current command value by said handle-returning control current, wherein said handle-returning control section has a configuration to calculate said handle-returning control current by phase-compensating a velocity deviation between said target steering angle velocity and said actual steering angle velocity at a phase compensating section, and comprises:

a steering torque gain section to obtain a steering torque gain based on said steering torque;

a vehicle speed gain section to obtain a vehicle speed gain based on said vehicle speed;

a handle-returning control gain calculating section to calculate a handle-returning control gain by multiplying a compensated velocity deviation from said phase compensating section with said vehicles speed gain and said steering torque gain; and a handle-returning control current calculating section to perform at least one control calculation of a proportional control calculation (P), an integral control calculation (I) and a differential control calculation (D) for said handle-returning control gain, and to obtain said handle-returning control current by output-limiting with said vehicle speed gain and said steering torque gain.

24. The electric power steering apparatus according to claim 23, wherein said phase compensating section phase-compensates said velocity deviation by a phase lead compensation, or a phase delay compensation, or a combination of said phase lead compensation and said phase delay compensation.

25. An electric power steering apparatus that calculates a current command value based on at least a steering torque, drives a motor based on said current command value and assist-controls a steering system by a driving-control of said motor, comprising:

a handle-returning control section to calculate a handle-returning control current according to a steering angle, said steering torque, said current command value, a vehicle speed and an actual steering angle velocity, and to drive said motor with a compensated current command value obtained by compensating said current command value by said handle-returning control current, wherein said handle-returning control section comprises:

a target returning velocity calculating section to calculate a target returning velocity based on said steering angle and said vehicle speed;

a steering torque gain section to obtain a steering torque gain based on said steering torque;

a viscosity coefficient outputting section to obtain a viscosity coefficient C of said steering system based on said vehicle speed;

a vehicle speed gain section to obtain a vehicle speed gain based on said vehicle speed;

a first steering system characteristic section to calculate a target velocity value ω1 from an addition value, which is added said steering torque to an assist torque calculated from said current command value, and said viscosity coefficient C;

a filter to filter-process said target velocity value ω1;

a second steering system characteristic section to input a target velocity value ω3 obtained by correction-processing said target returning velocity with a target velocity value ω2 from said filter, and to obtain a target steering angle velocity from said viscosity coefficient C and an inertia moment J of said steering system;

a phase compensating section to phase-compensate a velocity deviation between said target steering angle velocity and said actual steering angle velocity;

a handle-returning control gain calculating section to calculate a handle-returning control gain by multiplying a compensated velocity deviation from said phase compensating section with said vehicle speed gain and said steering torque gain; and a handle-returning control current calculating section to perform at least one control calculation of a proportional control calculation (P), an integral control calculation (I) and a differential control calculation (D) for said handle-returning control gain, and to obtain said handle-returning control current by output-limiting with said vehicle speed gain and said steering torque gain.

26. The electric power steering apparatus according to claim 25, wherein said phase compensating section phase-compensates said velocity deviation by a phase lead compensation, or a phase delay compensation, or a combination of said phase lead compensation and said phase delay compensation.

* * * * *